US010293688B2

(12) United States Patent
Arai

(10) Patent No.: US 10,293,688 B2
(45) Date of Patent: May 21, 2019

(54) CONTROL DEVICE FOR FOUR-WHEEL-DRIVE VEHICLE AND CONTROL METHOD FOR FOUR-WHEEL-DRIVE VEHICLE

(71) Applicant: TOYOTA JIDOSHA KABUSHIKI KAISHA, Toyota-shi, Aichi-ken (JP)

(72) Inventor: Masayuki Arai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/702,017

(22) Filed: Sep. 12, 2017

(65) Prior Publication Data

US 2018/0086202 A1 Mar. 29, 2018

(30) Foreign Application Priority Data

Sep. 23, 2016 (JP) ................................ 2016-186220

(51) Int. Cl.
*B60K 17/344* (2006.01)
*B60K 23/08* (2006.01)
(Continued)

(52) U.S. Cl.
CPC ........ *B60K 23/0808* (2013.01); *B60K 17/344* (2013.01); *B60K 17/354* (2013.01); *B60K 23/08* (2013.01); *B60W 10/119* (2013.01); *F16H 37/065* (2013.01); *F16H 61/28* (2013.01); *B60K 17/08* (2013.01); *B60K 2023/085* (2013.01);
(Continued)

(58) Field of Classification Search
CPC .. B60K 23/0808; B60K 17/354; B60K 23/08; B60K 17/344; B60K 2023/085; B60K 17/08; F16H 61/28; F16H 37/065; F16H 2200/0034; F16H 2200/2005; B60W 10/119; B60W 2054/04; B60W 2520/10; B60W 2510/0208
See application file for complete search history.

(56) References Cited

U.S. PATENT DOCUMENTS 5,199,325 A 4/1993 Reuter et al.
5,330,030 A 7/1994 Eastman et al.
(Continued)

FOREIGN PATENT DOCUMENTS

EP 3009293 A1 4/2016
JP 2017-065669 A 4/2017
(Continued)

OTHER PUBLICATIONS

ESM Electronic Service Manual 2012QX, US, Nissan North America, Inc. Jul. 2011, pp. DLN-13-DLN-16.

*Primary Examiner* — David J Hlavka
(74) *Attorney, Agent, or Firm* — Oliff PLC

(57) ABSTRACT

An electronic control unit switches a driving mode to a high-gear two-wheel driving mode when a first condition and a second condition are satisfied at the time of driving in a high-gear four-wheel driving mode, and switches the driving mode from the high-gear two-wheel driving mode to the low-gear driving mode when a third condition is satisfied in a state in which the first and second conditions are satisfied. Accordingly, it is possible to shorten a time required for switching to the low-gear driving mode after all of the first to third conditions are satisfied.

3 Claims, 10 Drawing Sheets

10
200 ELECTRONIC CONTROL UNIT
230 MODE SWITCHING CONTROL UNIT
232 L4L SWITCHING ESTIMATING UNIT
234 H2 SWITCHING UNIT
236 L4L SWITCHING DETERMINING UNIT
238 L4L SWITCHING PERFORMING UNIT
202 Ne
204 θm
206 Nwfl,Nwfr Nwrl,Nwrr
208 θacc
210 Shl
212 4WDon
214 4LOCKon
130 Pig
220 222 Psh
240 Si DISPLAY DEVICE
14R 16R 14L 16L
Sd Se Ssh Sm
12 ENGINE 20 TRANSMISSION 22 TRANSFER 84
26 32R 34R 34L 32L 38 30 28 24 18

(51) Int. Cl.

| | |
|---|---|
| ***B60K 17/354*** | (2006.01) |
| ***F16H 37/06*** | (2006.01) |
| ***B60W 10/119*** | (2012.01) |
| ***F16H 61/28*** | (2006.01) |
| *B60K 17/08* | (2006.01) |

(52) U.S. Cl.

CPC . *B60W 2510/0208* (2013.01); *B60W 2520/10* (2013.01); *B60W 2540/04* (2013.01); *F16H 2200/0034* (2013.01); *F16H 2200/2005* (2013.01)

(56) References Cited

U.S. PATENT DOCUMENTS

| | | | | |
|---|---|---|---|---|
| 6,125,317 | A | 9/2000 | Prakash et al. | |
| 2007/0251345 | A1 | 11/2007 | Kriebernegg et al. | |
| 2015/0038276 | A1 | 2/2015 | Lee | |
| 2016/0053888 | A1 | 2/2016 | Tsuji et al. | |
| 2016/0152238 | A1* | 6/2016 | Mita .................. | B60K 23/0808 180/197 |
| 2017/0036538 | A1* | 2/2017 | Imafuku ............ | B60K 17/3467 |
| 2017/0087985 | A1 | 3/2017 | Imafuku | |

FOREIGN PATENT DOCUMENTS

| | | | |
|---|---|---|---|
| KR | 2015-0015313 | A | 2/2015 |
| KR | 2016-0022231 | A | 2/2016 |

* cited by examiner

FIRST STATE
SECOND STATE
THIRD STATE
100
100b
100c
100d
100e
100f
103a
C1
D
F1
F2

START
S1
H2, H4A, OR H4L?
YES
NO
S2
NEUTRAL STATE?
YES
NO
S3
BUZZER SOUNDING OR IND BLINKING?
YES
NO
S4
DOES VEHICLE STOP?
YES
NO
S5
SWITCH TO H2 POSITION
A
S6
IS LOW GEAR STAGE SELECTED?
YES
NO
S7
PERFORM BUZZER SOUNDING OR IND BLINKING
S8
STOP BUZZER SOUNDING AND RELEASE IND BLINKING
S9
DOES VEHICLE STOP?
YES
NO
S10
SET L4L SWITCHING CONDITION A
S11
SET L4L SWITCHING CONDITION B

CONTROL DEVICE FOR FOUR-WHEEL-DRIVE VEHICLE AND CONTROL METHOD FOR FOUR-WHEEL-DRIVE VEHICLE

INCORPORATION BY REFERENCE

The disclosure of Japanese Patent Application No. 2016-186220 filed on Sep. 23, 2016 including the specification, drawings and abstract is incorporated herein by reference in its entirety.

BACKGROUND

1. Technical Field

The disclosure relates to a four-wheel-drive vehicle and more particularly to a control device for a four-wheel-drive vehicle in which a driving mode is mechanically switched to a high-gear four-wheel driving mode and a low-gear driving mode via a high-gear two-wheel driving mode and a control method for the four-wheel-drive vehicle.

2. Description of Related Art

U.S. Patent Application Publication No. 2007/0251345 (US 2007-0251345 A) describes a transfer for a four-wheel-drive vehicle including an input shaft, a first output shaft that outputs a driving force to one of front and rear wheels, a second output shaft that outputs a driving force to the other of the front and rear wheels, a high-low gear shift mechanism that shifts a rotation speed of the input shaft to two stages which are a high gear stage and a low gear stage and transmits the rotation speed to the first output shaft, and a friction-engaging clutch that sets up and cuts off transmission of power between the first output shaft and the second output shaft. In "ESM Electronic Service Manual 2012 QX," (U.S.), NISSAN NORTH AMERICA, INC., July, 2011, p. DLN-13-DLN-16, a transfer for a four-wheel-drive vehicle including a meshing lock mechanism that is disposed in parallel to a clutch and causes the first output shaft and the second output shaft to mechanically engage with each other is described. In the transfer for a four-wheel-drive vehicle, a high-gear four-wheel driving mode in which a high-low gear shift mechanism is set to a high gear stage, the clutch is in a setup state, and the lock mechanism is unlocked and a high-gear two-wheel driving mode in which the high-low gear shift mechanism is set to the high gear stage, the clutch is in a cutoff state, and the lock mechanism is unlocked can be set up. As an example of the low-gear driving mode, a low-gear four-wheel lock driving mode in which the high-low gear shift mechanism is set to a low gear stage, the clutch is in the cutoff state, and the lock mechanism is in an engaged state can be set up. The low-gear four-wheel lock driving mode can be suitably selected, for example, when the vehicle travels an off road such as on a riverbed, a rocky area, or a steep slope with a large torque and at a low speed.

SUMMARY

In such a transfer for a four-wheel-drive vehicle, when a driving mode is switched to the low-gear driving mode via the high-gear two-wheel driving mode at the time of switching from the high-gear four-wheel driving mode to the low-gear driving mode, a time required for switching therefor is increased. Switching to the low-gear driving mode, that is, switching to a low gear stage of the high-low gear shift mechanism, is provided with permission conditions such as being in a stop state and a neutral state in which transmission of power between a driving force source and an input shaft is cut off in order to prevent gear noise and the like from being generated. Accordingly, when the time required for switching to the low-gear driving mode increases and, for example, a starting operation is performed subsequent to an operation of switching to the low-gear driving mode, a driving force is transmitted during switching of the driving mode, that is, at the time of transient gear shift of the high-low gear shift mechanism and there is a likelihood that gear noise and the like will be generated.

The disclosure is for setting up a low-gear driving mode as rapidly as possible when a driving mode is switched from a high-gear four-wheel driving mode to the low-gear driving mode via a high-gear two-wheel driving mode.

A first aspect of the disclosure is a control device for a four-wheel-drive vehicle. The vehicle includes an input shaft, a first output shaft, a second output shaft, a high-low gear shift mechanism, a clutch, a mode switching device, a mode selection operating device, and an electronic control unit. The first output shaft is configured to output a driving force to one of front wheels and rear wheels. The second output shaft is configured to output the driving force to the other of the front wheels and the rear wheels. The high-low gear shift mechanism is configured to shift a rotation speed of the input shaft to one of a high gear stage and a low gear stage and is configured to transmit the driving force to the first output shaft. The clutch is configured to disengage and engage to cut off and establish transmission of power between the first output shaft and the second output shaft. The mode switching device is configured to mechanically switch between a high-gear four-wheel driving mode and a low-gear driving mode via a high-gear two-wheel driving mode. The high-gear four-wheel driving mode is a driving mode of the vehicle in which the high-low gear shift mechanism is set to the high gear stage and the clutch is in an engagement state. The high-gear two-wheel driving mode is a driving mode of the vehicle in which the high-low gear shift mechanism is set to the high gear stage and the clutch is in a disengagement state. The low-gear driving mode is a driving mode of the vehicle in which the high-low gear shift mechanism is set to the low gear stage. The mode selection operating device is a device that is operated by a driver to select the low-gear driving mode. The electronic control unit is configured to control the mode switching device such that the driving mode is switched to the low-gear driving mode when the electronic control unit determines that all of a first condition, a second condition, and a third condition are satisfied. The first condition is a condition of the vehicle being in a stop state. The second condition is a condition of transmission of power being a neutral state in which transmission of power between a driving force source and the input shaft is cut off. The third condition is a condition of the low-gear driving mode being selected by operation of the mode selection operating device. The electronic control unit is configured to control the mode switching device such that the driving mode is switched from the high-gear four-wheel driving mode to the high-gear two-wheel driving mode when the electronic control unit determines that the first condition and the second condition are satisfied at the time of driving in the high-gear four-wheel driving mode. The electronic control unit is configured to control the mode switching device such that the driving mode is switched from the high-gear two-wheel driving mode to the low-gear driving mode when the electronic control unit determines that the third condition is satisfied in a state in which the first condition and the second condition have been satisfied.

With this configuration, when the vehicle is in the stop state and in the neutral state in which transmission of power between the driving force source and the input shaft is cut off and thus the first condition and the second condition are satisfied at the time of driving in the high-gear four-wheel driving mode, the driving mode is switched to the high-gear two-wheel driving mode without waiting for selection of the low-gear driving mode. When the low-gear driving mode is selected in this state and thus the third condition is satisfied, the driving mode is switched from the high-gear two-wheel driving mode to the low-gear driving mode and thus a time required for switching to the low-gear driving mode after the first to third conditions have been satisfied is shortened. Accordingly, even when a starting operation is performed immediately after the first to third conditions have been satisfied, it is possible to appropriately prevent gear noise or the like from being generated due to transmission of power by the starting operation at the time of transient gear shift of the high-low gear shift mechanism. When the driving mode is switched to the high-gear two-wheel driving mode in the stop state and in the neutral state, it is possible to prevent an influence such as a variation of the driving force on behavior of the vehicle and to prevent a driver from feeling discomfort.

In the control device for a four-wheel-drive vehicle, the electronic control unit may be configured to control the mode switching device such that the driving mode is switched from the high-gear four-wheel driving mode to the high-gear two-wheel driving mode when the electronic control unit determines that the second condition and one of the first condition and the third condition are satisfied at the time of driving the vehicle in the high-gear four-wheel driving mode. The electronic control unit may be configured to control the mode switching device such that the driving mode is switched from the high-gear two-wheel driving mode to the low-gear driving mode when the electronic control unit determines that the other of the first condition and the third condition is satisfied in a state in which the second condition and one of the first condition and the third condition are satisfied.

With this configuration, the driving mode is switched to the high-gear two-wheel driving mode when two conditions including the second condition among the first to third conditions are satisfied at the time of driving in the high-gear four-wheel driving mode, and the driving mode is switched from the high-gear two-wheel driving mode to the low-gear driving mode when the remaining one condition is satisfied in this state. Accordingly, even when a violation operation of selecting the low-gear driving mode is performed before the first condition and the second condition are satisfied and the vehicle is in the neutral state, the time required for switching to the low-gear driving mode after the vehicle has been brought into the stop state and all of the first to third conditions are satisfied is shortened by switching the driving mode to the high-gear two-wheel driving mode at that time. Accordingly, the number of types of switching patterns for shortening the time required for switching to the low-gear driving mode all of the first to third conditions are satisfied increases and it is possible to more appropriately prevent gear noise and the like from being generated when a starting operation is performed immediately after all of the first to third conditions have been satisfied. Since the driving mode is switched to the high-gear two-wheel driving mode when two conditions including the neutral state are satisfied, it is possible to prevent an influence such as a variation of the driving force on behavior of the vehicle and to prevent a driver from feeling discomfort.

A second aspect of the disclosure is a control method for a four-wheel-drive vehicle. The vehicle includes an input shaft, a first output shaft, a second output shaft, a high-low gear shift mechanism, a clutch, a mode switching device, a mode selection operating device, and an electronic control unit. The first output shaft is configured to output a driving force to one of front wheels and rear wheels. The second output shaft is configured to output the driving force to the other of the front wheels and the rear wheels. The high-low gear shift mechanism is configured to shift a rotation speed of the input shaft to one of a high gear stage and a low gear stage and is configured to transmit the driving force to the first output shaft. The clutch is configured to disengage and engage to cut off and establish transmission of power between the first output shaft and the second output shaft. The mode switching device is configured to mechanically switch between a high-gear four-wheel driving mode and a low-gear driving mode via a high-gear two-wheel driving mode. The high-gear four-wheel driving mode is a driving mode of the vehicle in which the high-low gear shift mechanism is set to the high gear stage and the clutch is in an engagement state. The high-gear two-wheel driving mode is a driving mode of the vehicle in which the high-low gear shift mechanism is set to the high gear stage and the clutch is in disengagement state. The low-gear driving mode is a driving mode of the vehicle in which the high-low gear shift mechanism is set to the low gear stage. The mode selection operating device is a device that is operated by a driver to select the low-gear driving mode. The control method includes: controlling, by the electronic control unit, the mode switching device such that the driving mode is switched to the low-gear driving mode when the electronic control unit determines that all of a first condition, a second condition, and a third condition are satisfied; controlling, by the electronic control unit, the mode switching device such that the driving mode is switched from the high-gear four-wheel driving mode to the high-gear two-wheel driving mode when the electronic control unit determines that the first condition and the second condition are satisfied at the time of driving in the high-gear four-wheel driving mode; and controlling, by the electronic control unit, the mode switching device such that the driving mode is switched from the high-gear two-wheel driving mode to the low-gear driving mode when the electronic control unit determines that the third condition is satisfied in a state in which the first condition and the second condition have been satisfied. The first condition is a condition of the vehicle being in a stop state. The second condition is a condition of transmission of power being in a neutral state in which transmission of power between a driving force source and the input shaft is cut off. The third condition is a condition of the low-gear driving mode being selected by operation of the mode selection operating device.

With this configuration, when the vehicle is in the stop state and in the neutral state in which transmission of power between the driving force source and the input shaft is cut off and thus the first condition and the second condition are satisfied at the time of driving in the high-gear four-wheel driving mode, the driving mode is switched to the high-gear two-wheel driving mode without waiting for selection of the low-gear driving mode. When the low-gear driving mode is selected in this state and thus the third condition is satisfied, the driving mode is switched from the high-gear two-wheel driving mode to the low-gear driving mode and thus a time required for switching to the low-gear driving mode after the first to third conditions have been satisfied is shortened. Accordingly, even when a starting operation is performed immediately after the first to third conditions are satisfied, it is possible to appropriately prevent gear noise or the like from being generated due to transmission of power by the starting operation at the time of transient gear shift of the high-low gear shift mechanism. When the driving mode is switched to the high-gear two-wheel driving mode in the stop state and in the neutral state, it is possible to prevent an influence such as a variation of the driving force on behavior of the vehicle and to prevent a driver from feeling discomfort.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
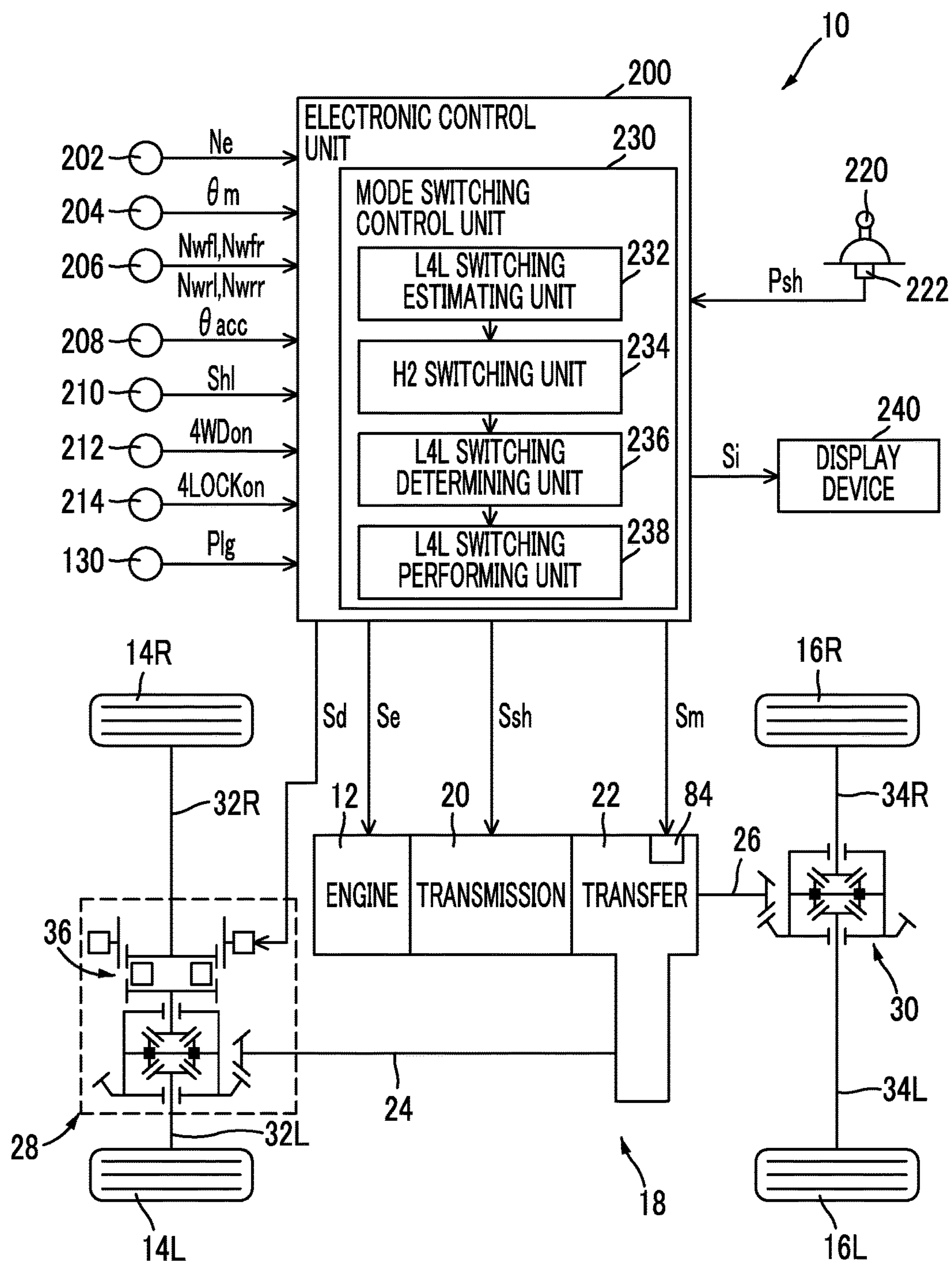
FIG. 1 is a diagram illustrating a schematic configuration of a drive system of a four-wheel-drive vehicle to which the disclosure is applied and illustrating a principal part of a control system for switching a driving mode.

A first output shaft and a second output shaft serve to transmit a driving force to one and the other of front and rear wheels, where the first output shaft may be for a front-wheel side and the second output shaft may be for a rear-wheel side, or the first output shaft may be for a rear-wheel side and the second output shaft may be for a front-wheel side. A high-gear four-wheel (H4) driving mode in which a high-low gear shift mechanism is set to a high gear stage and a four-wheel-drive clutch (hereinafter referred to as a 4WD clutch) is in a setup state may be a high-gear four-wheel automatic (H4A) driving mode and a high-gear four-wheel lock (H4L) driving mode, for example, when the 4WD clutch is a friction-engaging clutch, but may be only one thereof. In the high-gear four-wheel automatic (H4A) driving mode, a transmission torque of the friction-engaging clutch is continuously changed. In the high-gear four-wheel lock (H4L) driving mode, the friction-engaging clutch is completely engaged. The 4WD clutch may be engaged with a predetermined transmission torque capacity. In a transfer including a meshing type 4WD clutch, that is, a four-wheel-drive lock mechanism (hereinafter a 4WD lock mechanism), that mechanically directly connects the first output shaft and the second output shaft instead of the friction-engaging 4WD clutch, the H4L driving mode can be set up using the 4WD lock mechanism. A low-gear driving mode in which the high-low gear shift mechanism is at a low gear stage may be a low-gear two-wheel (L2) driving mode, but, for example, a low-gear four-wheel lock (L4L) driving mode is possible in the transfer including a meshing type 4WD lock mechanism. In the low-gear four-wheel lock (L4L) driving mode, the high-low gear shift mechanism is at a low gear stage and the 4WD lock mechanism is in an engaged state. The meshing type 4WD lock mechanism is disposed to be parallel to the 4WD clutch and mechanically directly connects the first output shaft and the second output shaft to each other. In the transfer including a friction-engaging 4WD clutch instead of the 4WD lock mechanism, a low-gear four-wheel automatic (L4A) driving mode and the L4L driving mode are possible. In the low-gear four-wheel automatic (L4A) driving mode, a transmission torque of the 4WD clutch is continuously changed. In the L4L driving mode, the 4WD clutch is completely engaged.

A mode switching device includes (a) an electric motor, (b) a screw mechanism in which an axially moving screw member which is one of a screw shaft member and a nut member is moved in an axial direction by rotationally driving a rotary screw member which is one of the screw shaft member and the nut member which are screwed to each other using the electric motor, (c) a first transmission mechanism that mechanically switches the 4WD clutch to a setup state with movement of the axially moving screw member in one direction of the axial direction and mechanically switches the 4WD clutch to a cutoff state with movement of the axially moving screw member in the reverse direction, (d) a switching shaft that is disposed to be movable in a direction parallel to the first output shaft and in the axial direction, (e) a cam mechanism that mechanically moves the switching shaft in the axial direction with rotation of the rotary screw member, and (f) a second transmission mechanism that mechanically switches the high-low gear shift mechanism to the high gear stage with movement of the switching shaft in one direction of the axial direction and mechanically switches the high-low gear shift mechanism to the low gear stage with movement of the switching shaft in the reverse direction, and (g) the mode switching device is configured to mechanically switch the driving mode from the high-gear four-wheel driving mode to the low-gear driving mode via the high-gear two-wheel driving mode with rotation of the rotary screw member in one direction and to mechanically switch the driving mode from the low-gear driving mode to the high-gear four-wheel driving mode via the high-gear two-wheel driving mode with rotation of the rotary screw member in the reverse direction.

The rotary screw member and the axially moving screw member may be the same screw member (a screw shaft member or a nut member) or may be different screw members, that is, the rotary screw member may be one of a screw shaft member and a nut member and the axially moving screw member may be the other of the screw shaft member and the nut member. The screw mechanism is disposed, for example, to be concentric with the first output shaft, but may be disposed on a different axis parallel to the first output shaft. For example, the cam mechanism includes a drum cam that mechanically rotates about an axis with rotation of the rotary screw member and a cam engagement member that engages with a cam groove disposed in the drum cam. The drum cam may be integrally fixed to be concentric with the rotary screw member of the screw mechanism, but the drum cam and the rotary screw member may be disposed on different axes and may be connected by a gear or the like. The mode switching device switches the driving mode to the high-gear four-wheel driving mode and the low-gear driving mode via the high-gear two-wheel driving mode with rotation of a single electric motor, but a mode switching device that switches the driving mode using different power sources such as a plurality of electric motors or cylinders may be employed.

Whether a second condition is satisfied, that is, whether the neutral state in which transmission of power between the driving force source and the input shaft is cut off is reached, can be determined based on whether a neutral operation of shifting a shift lever, which can be shifted to an R position for selecting reverse traveling, a D position for selecting forward traveling, and an N position for selecting neutral, has been performed when an automatic transmission is employed as a transmission. When a manual transmission is employed as a transmission, the determination can be performed, for example, based on whether an operation of depressing a clutch pedal to cut off an input clutch. When the neutral operation is performed using the shift lever and the neutral operation is performed after the first and third conditions are satisfied at the time of operation of the electronic control unit in the high-gear four-wheel driving mode, the mode switching device is controlled such that the driving mode is switched from the high-gear four-wheel driving mode to the high-gear two-wheel driving mode at the time point at which the second condition is satisfied. That is, when the second condition is satisfied in a state in which the first and third conditions are satisfied, a first switching control unit switches the driving mode from the high-gear four-wheel driving mode to the high-gear two-wheel driving mode. The first switching control unit is included in the electronic control unit. When a predetermined waiting time elapses after the neutral operation is performed, a second switching control unit may control the mode switching device such that the driving mode is switched from the high-gear two-wheel driving mode to the low-gear driving mode. In this case, since a violation operation is performed and there is a likelihood that the shift lever will be shifted to the R position or the D position via the N position, it is preferable that the driving mode be switched after a predetermined waiting time elapses for the purpose of confirmation of a will for the neutral operation. By switching the driving mode to the high-gear two-wheel driving mode using the waiting time, it is possible to shorten the time required for switching to the low-gear driving mode.

Hereinafter, embodiments of the disclosure will be described in detail with reference to the accompanying drawings. In the following embodiments, the drawings are appropriately simplified or modified and the dimensional ratios and shapes of elements and the like are not necessarily equal to actual ones.

FIG. 1 is a diagram illustrating a schematic configuration of a drive system of a four-wheel-drive vehicle 10 to which the disclosure is applied and illustrating a principal part of a control system for performing a variety of control in the four-wheel-drive vehicle 10. In FIG. 1, the four-wheel-drive vehicle 10 includes an engine 12 as a driving force source, right and left front wheels 14R and 14L (which are referred to as front wheels 14 when both are not particularly distinguished), right and left rear wheels 16R and 16L (which are referred to as rear wheels 16 when both are not particularly distinguished), and a power transmission device 18 that transmits power of the engine 12 to the front wheels 14 and the rear wheels 16. The rear wheels 16 are main drive wheels which serve as driving wheels during two-wheel-drive (2WD) traveling and during four-wheel-drive (4WD) traveling. The front wheels 14 are sub drive wheels which serve as driven wheels during 2WD traveling and serve as driving wheels during 4WD traveling. The four-wheel-drive vehicle 10 according to this embodiment is a four-wheel-drive vehicle based on front-engine rear-drive (FR). The engine 12 is an internal combustion engine such as a gasoline engine or diesel engine. Another driving force source such as an electric motor may be employed instead of the engine 12.

The power transmission device 18 includes a transmission 20 that is connected to the engine 12, a transfer 22 for a four-wheel-drive vehicle that is a front/rear wheel power split device connected to the transmission 20, a front propeller shaft 24 and a rear propeller shaft 26 that are connected to the transfer 22, a front-wheel differential gear mechanism 28 that is connected to the front propeller shaft 24, a rear-wheel differential gear mechanism 30 that is connected to the rear propeller shaft 26, right and left front-wheel axles 32R and 32L (which are referred to as front-wheel axles 32 when both are not particularly distinguished) that are connected to the front-wheel differential gear mechanism 28, and right and left rear-wheel axles 34R and 34L (which are referred to as rear-wheel axles 34 when both are not particularly distinguished) that are connected to the rear-wheel differential gear mechanism 30. In the power transmission device 18 having the above-mentioned configuration, power of the engine 12 that is transmitted to the transfer 22 via the transmission 20 is transmitted from the transfer 22 to the rear wheels 16 sequentially via the rear propeller shaft 26, the rear-wheel differential gear mechanism 30, the rear-wheel axles 34, and the like. A part of the power of the engine 12 transmitted to the rear wheels 16 side is split to the front wheels 14 side by the transfer 22 and is transmitted to the front wheels 14 sequentially via the front propeller shaft 24, the front-wheel differential gear mechanism 28, the front-wheel axles 32, and the like.

The transmission 20 is a stepped automatic transmission such as a planetary gear type or a biaxial meshing type, can set up a plurality of forward gear stages for forward traveling, a reverse gear stage for reverse traveling, and a neutral gear stage in which transmission of power is cut off, and is electrically switched in response to a shift control signal Ssh output from the electronic control unit 200 by allowing a driver to operate a shift lever 220 disposed in the vicinity of a driver seat. The shift lever 220 can be shifted to the D position for selecting forward traveling, the R position for selecting reverse traveling, and the N position for selecting neutral and is shifted to the N position to set the transmission 20 to neutral. That is, an operation of shifting the shift lever 220 to the N position is a neutral operation, where the transmission 20 serves as a cutoff mechanism. A manual transmission such as a biaxial meshing type that can be mechanically switched to a plurality of forward gear stages and the reverse gear stage by a driver's manual operation may be employed as the transmission 20. In this case, for example, an operation of depressing a clutch pedal to cut off the input clutch is the neutral operation.

The front-wheel differential gear mechanism 28 includes a front-side clutch 36 on the front-wheel axle 32R side (that is, between the front-wheel differential gear mechanism 28 and the front wheel 14R). The front-side clutch 36 is a meshing type clutch that is electrically (electromagnetically) controlled to selectively set up or cut off a power transmission path between the front-wheel differential gear mechanism 28 and the front wheel 14R. The front-side clutch 36 may further include a synchronization mechanism (synch mechanism).

Figure 2:
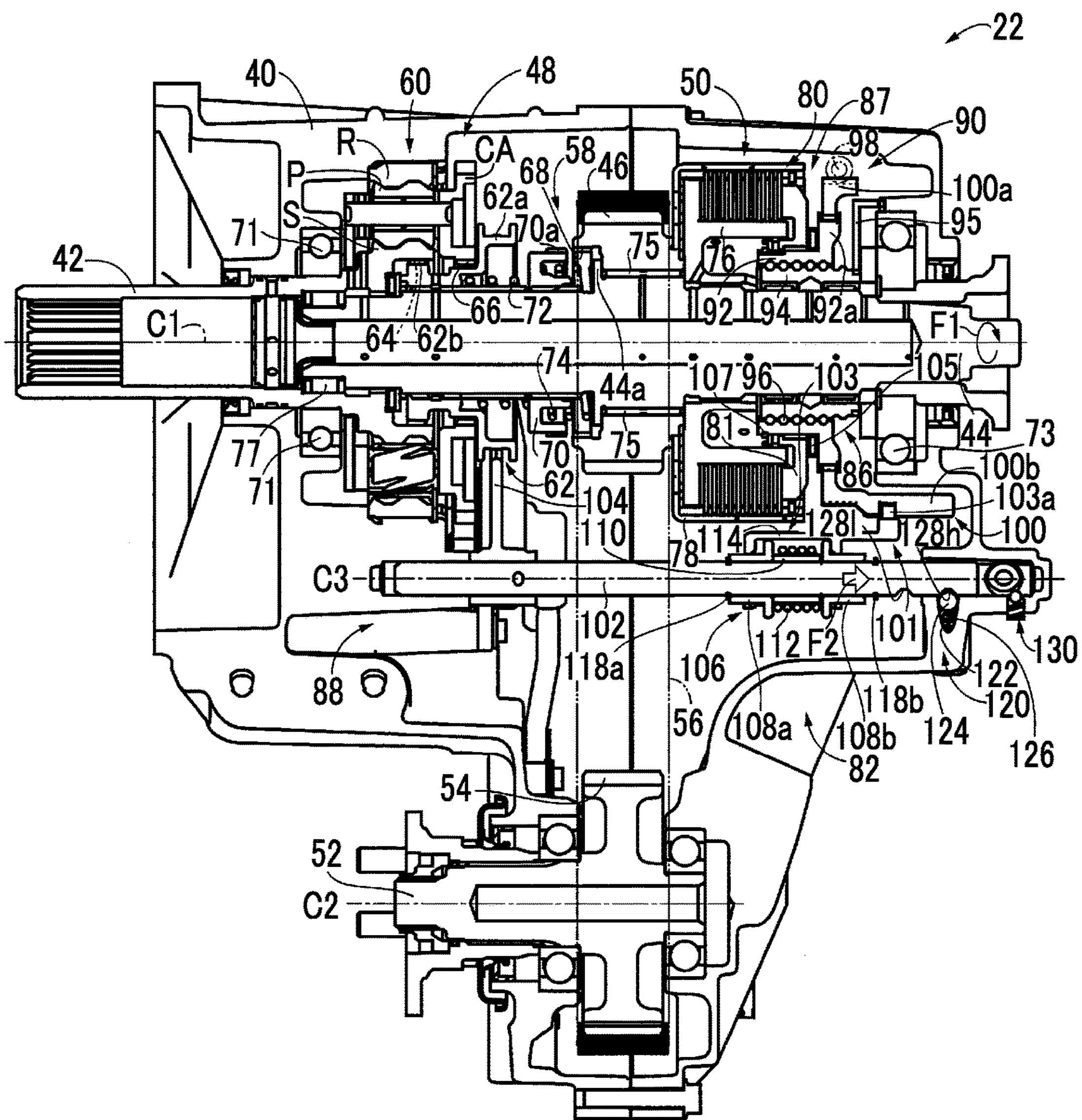
FIG. 2 is a cross-sectional view illustrating a transfer which is included in the four-wheel-drive vehicle illustrated in FIG. 1 and illustrating a state in a high-gear four-wheel (H4) driving mode.
Figure 3:
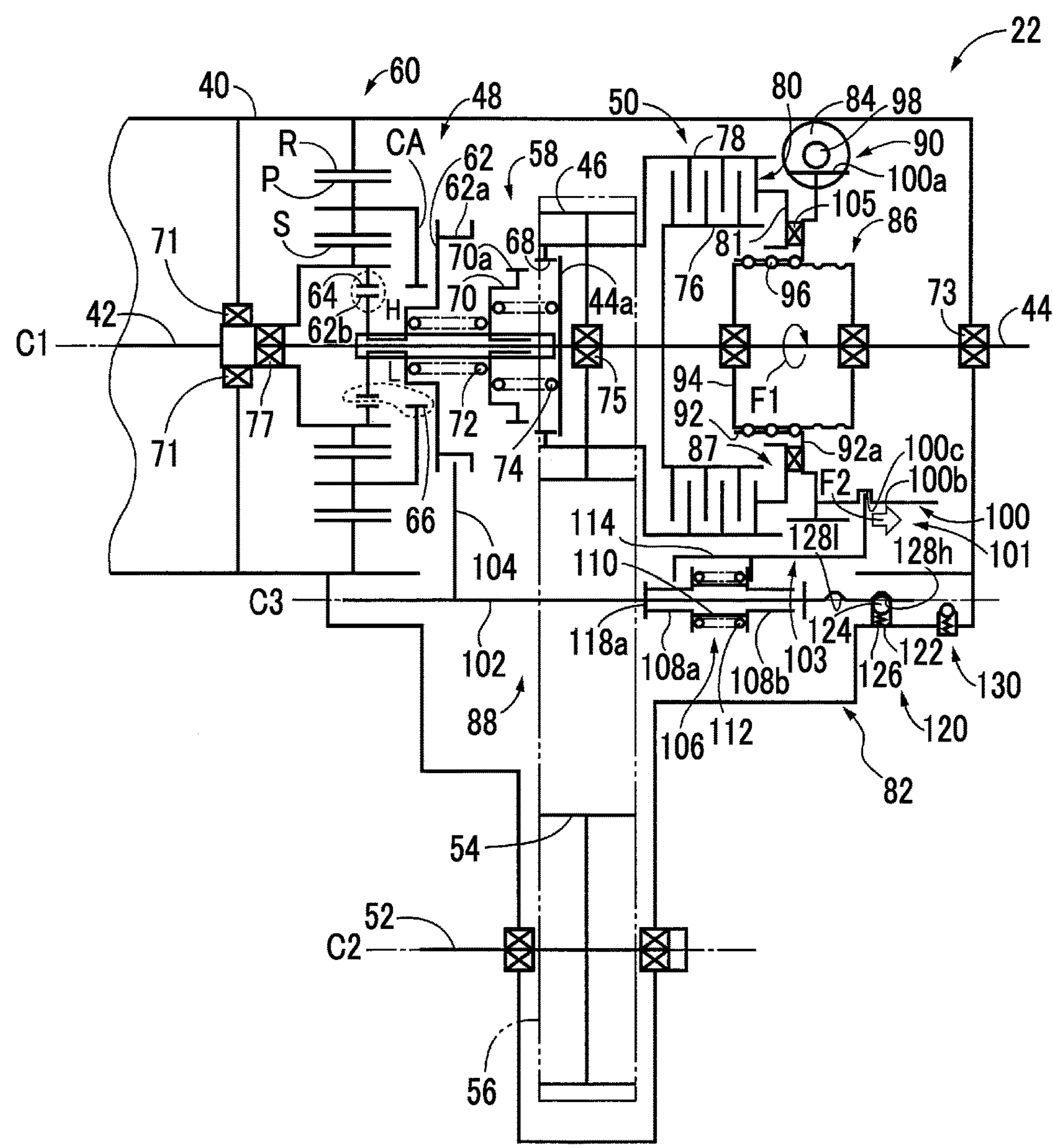
FIG. 3 is a skeleton diagram illustrating a schematic configuration of the transfer.
Figure 4:
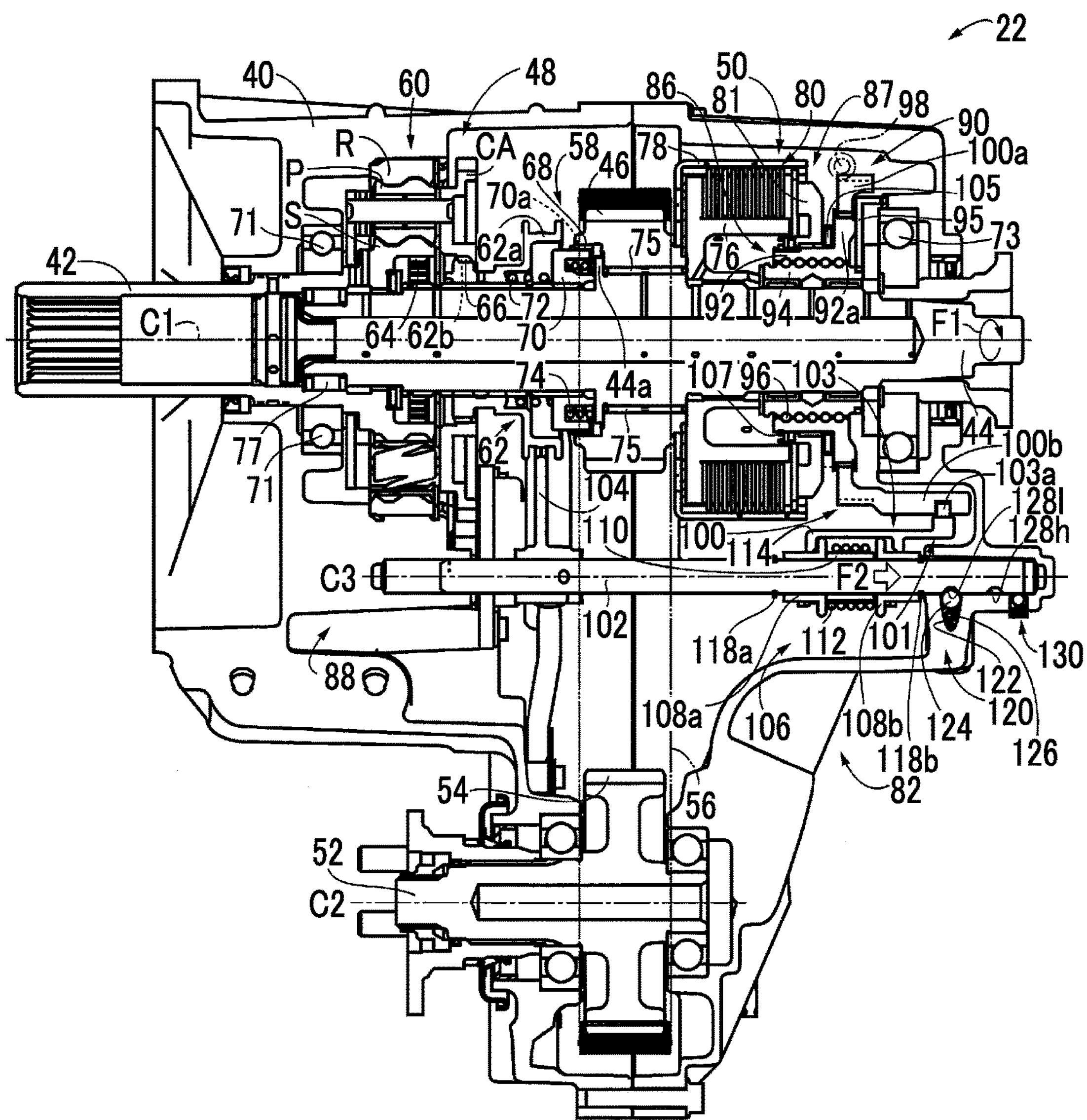
FIG. 4 is a cross-sectional view illustrating a state in which the transfer is in a low-gear four-wheel lock (L4L) driving mode.

FIGS. 2 to 4 are diagrams illustrating the schematic configuration of the transfer 22, where FIGS. 2 and 4 are cross-sectional views of the transfer 22 and FIG. 3 is a skeleton diagram of the transfer 22. In FIGS. 2 to 4, the transfer 22 includes a transfer case 40 as a non-rotary member. The transfer 22 outputs power to an input shaft 42 that is rotatably supported by the transfer case 40, a rear-wheel output shaft 44 that outputs power to the rear wheels 16, and the front wheels 14. That is, the transfer 22 adjusts a transmission torque which is transmitted from a sprocket-shaped drive gear 46 having an output destination of power other than that of the rear-wheel output shaft 44, a high-low gear shift mechanism 48 that serves as a sub transmission shifting a rotation speed of the input shaft 42 and transmitting the rotation speed to the rear-wheel output shaft 44, and the rear-wheel output shaft 44 to the drive gear 46. That is, the transfer 22 includes a front-wheel driving clutch 50, which serves as a multidisc friction clutch (a multi-disc clutch) that transmits a part of power of the rear-wheel output shaft 44 to the drive gear 46, on a common first axis (axis) C1. The input shaft 42 and the rear-wheel output shaft 44 are supported by the transfer case 40 via a first support bearing 71 and a second support bearing (an output shaft support bearing) 73 such that they are relatively rotatable about a concentric axis, and the drive gear 46 is supported via a third support bearing 75 such that it is relatively concentrically rotatable about the rear-wheel output shaft 44. That is, the input shaft 42, the rear-wheel output shaft 44, and the drive gear 46 are supported by the transfer case 40 such that they are rotatable about the first axis C1. An end on the front side of the rear-wheel output shaft 44 is rotatably supported by a bearing 77. The rear-wheel output shaft 44 is an example of the first output shaft, and the front-wheel driving clutch 50 is an example of the clutch.

As illustrated in FIGS. 2 to 4, in the transfer case 40, the transfer 22 includes a front-wheel output shaft 52 and a sprocket-shaped driven gear 54 disposed integrally with the front-wheel output shaft 52 on a common second axis C2 parallel to the first axis C1. The transfer 22 includes a front-wheel driving chain 56 that is wound between the drive gear 46 and the driven gear 54 and a 4WD lock mechanism 58 as a dog clutch that integrally connects the rear-wheel output shaft 44 and the drive gear 46. The front-wheel output shaft 52 is an example of the second output shaft.

The input shaft 42 is connected to an output shaft (not illustrated) of the transmission 20 via a joint and is rotationally driven by a driving force (a torque) input from the engine 12 via the transmission 20. The high-low gear shift mechanism 48 sets up one of a high gear stage (a high-side shift stage having a small gear shift ratio) H and a low gear stage (a low-side shift stage having a large gear shift ratio) L to shift a rotation speed of the transmission 20 and to transmits the rotation speed to the rear-wheel output shaft 44. The rear-wheel output shaft 44 is a main drive shaft that is connected to the rear propeller shaft 26 via a joint which is not illustrated. The front-wheel output shaft 52 is a sub drive shaft that is connected to the front propeller shaft 24 via a joint which is not illustrated.

The transfer 22 having the above-mentioned configuration adjusts a transmission torque which is transmitted to the drive gear 46 using the front-wheel driving clutch 50 and transmits power transmitted from the high-low gear shift mechanism 48 to only the rear wheels 16 or also splits the power to the front wheels 14. The transfer 22 is switched between a 4WD locked state (an engaged state) in which a rotation difference is not generated between the rear propeller shaft 26 and the front propeller shaft 24 and a 4WD unlocked state (a disengaged state) in which a rotation difference is permitted therebetween by the 4WD lock mechanism 58. That is, in the transfer 22, transmission of power from the rear-wheel output shaft 44 to the front-wheel output shaft 52 is not performed in a state in which a transmission torque via the front-wheel driving clutch 50 is zero and the 4WD lock mechanism 58 is disengaged. On the other hand, in the transfer 22, transmission of power from the rear-wheel output shaft 44 to the front-wheel output shaft 52 via the drive gear 46, the front-wheel driving chain 56, and the driven gear 54 is performed in a state in which a torque is transmitted via the front-wheel driving clutch 50 or the 4WD lock mechanism 58 is engaged.

The high-low gear shift mechanism 48 includes a single pinion type planetary gear mechanism 60 and a high-low sleeve 62. The planetary gear mechanism 60 includes a sun gear S that is connected to the input shaft 42 such that it is not relatively rotatable about the first axis C1, a ring gear R that is disposed concentric with the sun gear S and is connected to the transfer case 40 such that it is not rotatable about the first axis C1, and a carrier CA that supports a plurality of pinion gears P meshing with the sun gear S and the ring gear R such that they can rotate and revolve around the sun gear S. Accordingly, the rotation speed of the sun gear S is equal to the rotation speed of the input shaft 42 and the rotation speed of the carrier CA is lower than the rotation speed of the input shaft 42. High-side gear teeth 64 are disposed on the inner circumferential surface of the sun gear S, and low-side gear teeth 66 having the same diameter as the high-side gear teeth 64 are disposed in the carrier CA. The high-side gear teeth 64 are spline teeth associated with setup of the high gear stage H that outputs the same rotation speed as the input shaft 42. The low-side gear teeth 66 are spline teeth associated with setup of the low gear stage L that output a rotation speed lower than the rotation speed of the input shaft 42. The high-low sleeve 62 is spline-fitted to the rear-wheel output shaft 44 such that it is relatively movable in the direction of the first axis C1 and relatively non-rotatable and includes a fork connecting portion 62*a* and outer circumferential teeth 62*b* that are integrally disposed adjacent to the fork connecting portion 62*a*. The outer circumferential teeth 62*b* alternatively mesh with the high-side gear teeth 64 and the low-side gear teeth 66 by moving the high-low sleeve 62 in a direction parallel to the first axis C1. The same rotation speed as the rotation speed of the input shaft 42 is transmitted to the rear-wheel output shaft 44 by causing the high-side gear teeth 64 to mesh with the outer circumferential teeth 62*b*, and the rotation speed lower than the rotation speed of the input shaft 42 is transmitted to the rear-wheel output shaft 44 by causing the low-side gear teeth 66 to mesh with the outer circumferential teeth 62*b*. The high-side gear teeth 64 and the high-low sleeve 62 serve as a high gear stage clutch that forms the high gear stage H, and the low-side gear teeth 66 and the high-low sleeve 62 serve as a low gear stage clutch that forms the low gear stage L.

The 4WD lock mechanism 58 includes lock teeth 68 that are disposed on the inner circumferential surface of the drive gear 46 and a lock sleeve 70 that is spline-fitted to the rear-wheel output shaft 44 such that it is relatively movable in the direction of the first axis C1 and relatively non-rotatable. Outer circumferential teeth 70*a* that mesh with the lock teeth 68 formed on the drive gear 46 by movement in the direction of the first axis C1 are formed on the outer circumferential surface of the lock sleeve 70, and a 4WD locked state in which the rear-wheel output shaft 44 and the drive gear 46 rotate integrally is formed in the engaged state of the 4WD lock mechanism 58 in which the outer circumferential teeth 70*a* mesh with the lock teeth 68.

The high-low sleeve 62 is disposed in a space closer to the drive gear 46 with respect to the first support bearing 71 disposed on the input shaft 42 (more specifically, with respect to the planetary gear mechanism 60). The lock sleeve 70 is disposed separately from the high-low sleeve 62 adjacent thereto in a space between the high-low gear shift mechanism 48 and the drive gear 46. A first spring 72 in a preloaded state that comes into contact with the high-low sleeve 62 and the lock sleeve 70 and biases them to be separated from each other is disposed between the high-low sleeve 62 and the lock sleeve 70. A second spring 74 in a preloaded state that comes in contact with a spring bearing 44*a* of the rear-wheel output shaft 44 and the lock sleeve 70 and biases the lock sleeve 70 to the front side which is separated from the lock teeth 68 is disposed between the drive gear 46 and the lock sleeve 70. The first spring 72 and the second spring 74 are compression coil springs and the biasing force of the first spring 72 is set to be larger than the biasing force of the second spring 74. The spring bearing 44*a* is a flange of the rear-wheel output shaft 44 that is disposed to protrude to the outer circumference in a space on the inside in the radial direction of the drive gear 46. The high-side gear teeth 64 are disposed at a front-side position which is more distant from the lock sleeve 70 than the low-side gear teeth 66 in the direction of the first axis C1. The outer circumferential teeth 62*b* of the high-low sleeve 62 mesh with the high-side gear teeth 64 to set up the high gear stage H, by moving the high-low sleeve 62 to a high gear position on the front side (the left side in FIGS. 2 and 3) which is separated from the lock sleeve 70. The outer circumferential teeth 70*a* mesh with the low-side gear teeth 66 to set up the low gear stage L by moving the high-low sleeve 62 to a low gear position on the rear side (the right side in FIGS. 2 and 3) approaching the lock sleeve 70. The outer circumferential teeth 62*b* of the lock sleeve 70 mesh with the lock teeth 68 on the rear side (the right side in FIGS. 2 and 3) on which the lock sleeve 70 approaches the drive gear 46. The lock sleeve 70 moves to a lock position on the rear side by the biasing force of the first spring 72 with movement of the high-low sleeve 62 to the low gear position on the rear side, and thus the outer circumferential teeth 70*a* mesh with the lock teeth 68 and the 4WD lock mechanism 58 is switched to an engaged state (a 4WD locked state). The lock sleeve 70 moves to an unlock position on the front side by the biasing force of the second spring 74 with movement of the high-low sleeve 62 to a high gear position on the front side, and meshing of the outer circumferential teeth 70*a* and the lock teeth 68 is released and the 4WD lock mechanism 58 is switched to a disengaged state.

The front-wheel driving clutch 50 is a multi-disc friction clutch including a clutch hub 76 that is connected to the rear-wheel output shaft 44 such that it is relatively non-rotatable, a clutch drum 78 that is connected to the drive gear 46 such that it is relatively non-rotatable, a frictional engagement element 80 that is disposed between the clutch hub 76 and the clutch drum 78 and selectively connects and disconnects both, and a pressing member 81 that presses the frictional engagement element 80. The front-wheel driving clutch 50 is disposed on the first axis C1 on the opposite side of the 4WD lock mechanism 58 with respect to the drive gear 46 in the direction of the first axis C1, and the frictional engagement element 80 is pressed and frictionally engaged by the pressing member 81 that moves to the drive gear 46 side (the front side). That is, in a state in which the pressing member 81 moves to the front side (the left side in FIGS. 2 and 3) which is a pressing side and comes into contact with the frictional engagement element 80, the front-wheel driving clutch 50 is changed to a torque-varying connected state in which a transmission torque (a torque capacity) is adjustable or a completely connected state depending on a degree of movement of the pressing member 81. On the other hand, in a state in which the pressing member 81 moves to the rear side which is a non-pressing side which is separated from the drive gear 46 and does not come into contact with the frictional engagement element 80, the front-wheel driving clutch 50 is changed in the disengaged state (the cutoff state).

When the front-wheel driving clutch 50 is in the cutoff state and the 4WD lock mechanism 58 is in the disengaged state in which the outer circumferential teeth 70*a* of the lock sleeve 70 do not mesh with the lock teeth 68, transmission of power between the rear-wheel output shaft 44 and the drive gear 46 is cut off, and a 2WD state in which power from the transmission 20 is transmitted to only the rear wheels 16 is achieved. In the 2WD state, the high-gear two-wheel (H2) driving mode is set up by shifting the high-low gear shift mechanism 48 to the high gear stage H. When the high-low gear shift mechanism 48 is in the high gear stage H, the 4WD lock mechanism 58 is in the disengaged state, and the front-wheel driving clutch 50 is in the torque-varying connected state or the completely connected state, the 4WD state of the high gear stage, that is, the high-gear four-wheel (H4L) driving mode, is set up. In the H4 driving mode and in the torque-varying connected state of the front-wheel driving clutch 50, a rotation speed difference between the rear-wheel output shaft 44 and the drive gear 46 is permitted to achieve a differential state (the 4WD unlocked state) and the high-gear four-wheel automatic (H4A) driving mode in which a torque split ratio of the front wheels 14 and the rear wheels 16 can be continuously changed, for example, in a range of about 0:100 to 50:50 by controlling the transmission torque of the front-wheel driving clutch 50 is set up. In the completely connected state of the front-wheel driving clutch 50, the 4WD locked state in which the rear-wheel output shaft 44 and the drive gear 46 rotate integrally is achieved and the high-gear four-wheel lock (H4L) driving mode is set up. On the other hand, when high-low gear shift mechanism 48 is in the low gear stage L, the front-wheel driving clutch 50 is in the cutoff state, and the 4WD lock mechanism 58 is in the engaged state (the 4WD locked state), the low-gear four-wheel lock (L4L) driving mode is set up. The L4L driving mode is an example of the low-gear driving mode.

The transfer 22 includes a mode switching device 82 that activates the high-low gear shift mechanism 48, the front-wheel driving clutch 50, and the 4WD lock mechanism 58 to switch the driving mode. The mode switching device 82 includes an electric motor 84 (see FIG. 3), a screw mechanism 86, a first transmission mechanism 87 that transmits the translational motion of the screw mechanism 86 to the front-wheel driving clutch 50, a cam mechanism 101, a fork shaft 102, and a second transmission mechanism 88 that transmits the translational motion of the fork shaft 102 to the high-low gear shift mechanism 48 and the 4WD lock mechanism 58.

The screw mechanism 86 includes a nut member 92 and a screw shaft member 94 that are disposed concentric with the first axis C1 on the opposite side of the drive gear 46 with respect to the front-wheel driving clutch 50 and are screwed to each other. The nut member 92 is rotationally driven by the electric motor 84 via a worm gear 90 serving as a reduction mechanism. The screw shaft member 94 is fixed to the transfer case 40 via a connection member 95 such that it is not movable in the direction of the first axis C1 and is not rotatable about the first axis C1. The nut member 92 is screwed to the screw shaft member 94 via a plurality of balls 96, and the screw mechanism 86 is a ball screw in which the nut member 92 and the screw shaft member 94 operate via the plurality of balls 96. In the screw mechanism 86 having the above-mentioned configuration, the nut member 92 moves linearly in the direction of the first axis C1 by rotationally driving the nut member 92 using the electric motor 84. That is, the nut member 92 serves as a rotary screw member that is rotationally driven by the electric motor 84 and serves as an axially moving screw member that moves in the axial direction. The screw mechanism 86 is a left-handed screw, and when the nut member 92 is rotationally driven in the direction of an arrow F1 (a right rotating direction when viewed from the rear side which is the right side in the drawing) about the first axis C1 by the electric motor 84, the nut member 92 moves in the rear direction in which it is separated from the front-wheel driving clutch 50, that is, in the direction of an arrow F2, by screwing to the screw shaft member 94

A worm gear 90 is a gear pair including a worm 98 that is disposed in a motor shaft of the electric motor 84 and a worm wheel 100*a* that is formed in a drum cam 100 fixed concentric with a flange 92*a* formed at a rear end of the nut member 92. The worm wheel 100*a* formed in the drum cam 100 is rotationally driven by the electric motor 84 and moves in the direction of the first axis C1 integrally with the nut member 92. The width of the worm wheel 100*a* in the direction of the first axis C1 is set to be greater than the width of the worm 98 in the direction of the first axis C1 such that the worm wheel 100*a* and the worm 98 normally mesh with each other regardless of movement of the worm wheel 100*a*, and the outer circumferential teeth of the worm wheel 100*a* are formed as spur teeth.

The first transmission mechanism 87 includes a thrust bearing 105 that is disposed between the pressing member 81 and the flange 92*a* of the nut member 92 and a stopper member 107 that stops relative movement of the pressing member 81 to the frictional engagement element 80 side with respect to the nut member 92 by a predetermined dimension or more. The pressing member 81 is connected to the nut member 92 such that the relative movement of the pressing member 81 in the direction of the first axis C1 with respect to the nut member 92 is limited by the thrust bearing 105 and the stopper member 107 and is relatively rotatable about the first axis C1. Accordingly, the translational motion of the nut member 92 in the screw mechanism 86 is transmitted to the frictional engagement element 80 of the front-wheel driving clutch 50 via the first transmission mechanism 87, and the front-wheel driving clutch 50 is switched to the cutoff state, the torque-varying connected state, and the completely connected state depending on the position of the nut member 92 in the axial direction. Specifically, in a state in which the nut member 92 is located on the rear side in the direction of the first axis C1 as illustrated in FIG. 4, the pressing member 81 is separated from the frictional engagement element 80 to switch the front-wheel driving clutch 50 to the disengaged state. When the nut member 92 further moves to the front side, the pressing member 81 comes into contact with the frictional engagement element 80 to switch the front-wheel driving clutch 50 to the torque-varying connected state. When the nut member 92 further moves to the front side, the front-wheel driving clutch 50 is switched to the completely connected state as illustrated in FIG. 2.

The drum cam 100 includes the worm wheel 100*a*, a protrusion 100*b* that is disposed to protrude from the worm wheel 100*a* to the rear side in parallel to the first axis C1, and a cam groove 100*c* that is formed on the outer circumference of the protrusion 100*b*. The protrusion 100*b* forms an arc shape (a partially cylindrical shape) with a predetermined angle range about the first axis C1 because a part of the worm wheel 100*a* in the circumferential direction protrudes to the rear side.

Figure 7:
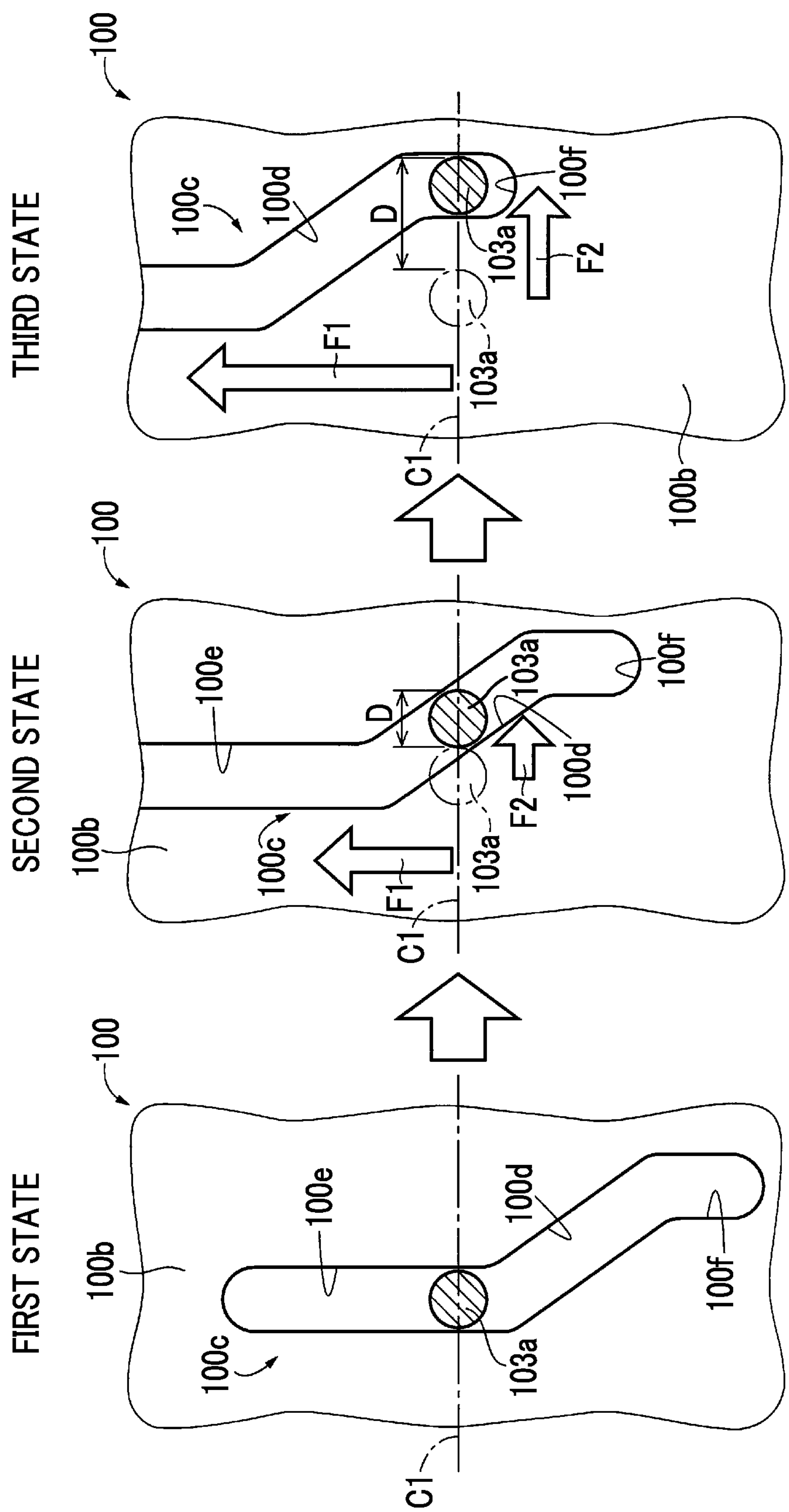
FIG. 7 is a development view illustrating a part taken along arrow VII-VII in FIG. 5 and illustrating a cam mechanism that moves a cam engagement member in a direction parallel to a first axis C1 with rotation of a drum cam.

The cam groove 100*c* formed in the drum cam 100 includes an inclined cam groove portion 100*d* that extends in a direction inclined to the first axis C1, a first vertical cam groove portion 100*e* that is formed at an end on the front side (the screw mechanism 86 side) of the inclined cam groove portion 100*d* and extends in a direction perpendicular to the first axis C1, and a second vertical cam groove portion 100*f* that is disposed at an end on the rear side of the inclined cam groove portion 100*d* and extends in a direction perpendicular to the first axis C1, as illustrated in FIG. 7. FIG. 7 is a flat development view of the arc-shaped protrusion 100*b*. According to the drum cam 100 having the above-mentioned configuration, for example, when the drum cam 100 is rotationally driven in the direction of the arrow F1 about the first axis C1 integrally with the nut member 92 by the electric motor 84 from the state in which an engagement protrusion 103*a* of a cam engagement member 103 engages with the first vertical cam groove portion 100*e* of the cam groove 100*c* of the drum cam 100 as illustrated in the first state in FIG. 7, the engagement protrusion 103*a* moves in the direction of the arrow F2 which is the rear side along the inclined cam groove portion 100*d* as illustrated in the second state and the third state in FIG. 7. The degree of movement D thereof is set to a magnitude including a degree of movement by which the nut member 92 moves in the direction of the arrow F2 by screwing to the screw shaft member 94. For example, when the drum cam 100 is rotationally driven in the opposite direction of the arrow F1 about the first axis C1 integrally with the nut member 92 by the electric motor 84 from the state in which an engagement protrusion 103*a* of a cam engagement member 103 engages with the second vertical cam groove portion 100*f* of the cam groove 100*c* of the drum cam 100 as illustrated in the third state in FIG. 7, the engagement protrusion 103*a* moves to the front side in the opposite direction of the arrow F2 along the inclined cam groove portion 100*d* as illustrated in the first state and the second state in FIG. 7. The degree of movement D at this time is set to a magnitude including a degree of movement by which the nut member 92 moves in the opposite direction of the arrow F2 by screwing to the screw shaft member 94. That is, when the drum cam 100 is rotationally driven around the first axis C1 along with the nut member 92 by the electric motor 84, the cam engagement member 103 reciprocates linearly in a direction parallel to the first axis C1 by the cam groove 100*c* formed in the drum cam 100. The cam engagement member 103 is disposed such that it is not rotatable about the first axis C1 and movable in the direction parallel to the first axis C1. The cam mechanism 101 is constituted by the drum cam 100 having the cam groove 100*c* formed therein and the cam engagement member 103.

Figure 5:
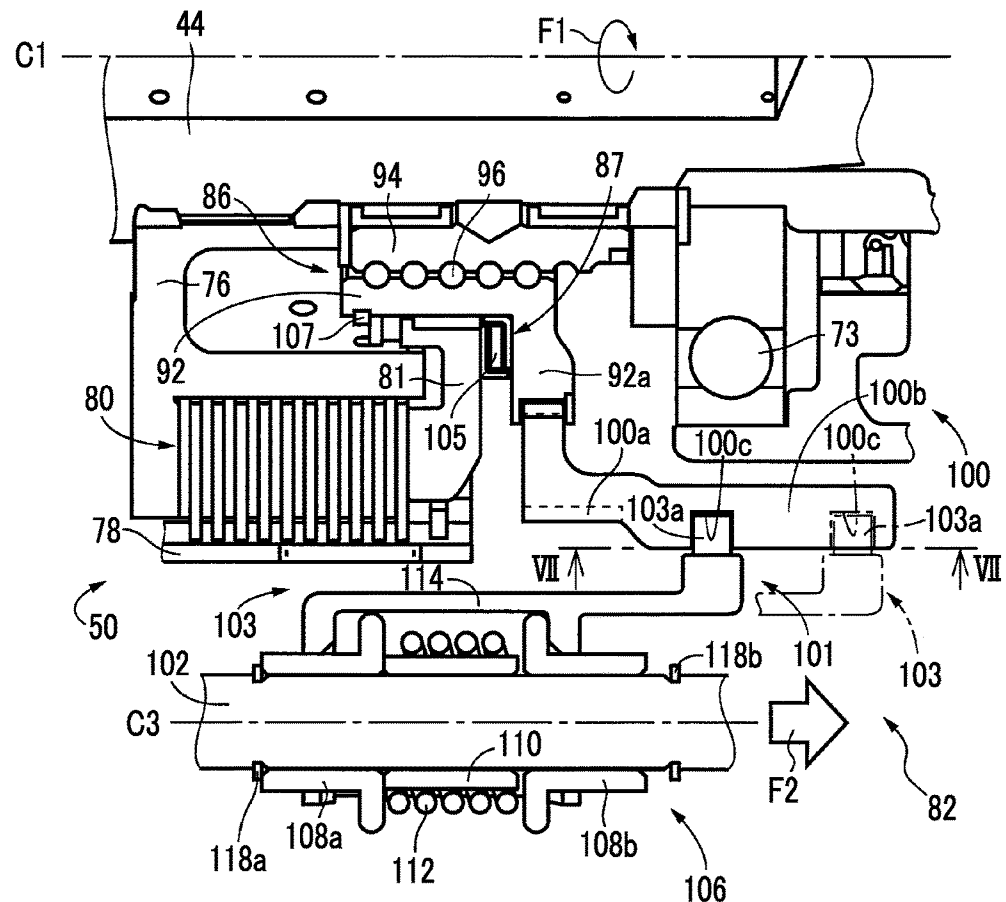
FIG. 5 is an enlarged cross-sectional view illustrating the vicinity of a front-wheel driving clutch and a cam mechanism which are disposed in the transfer.

The fork shaft 102 is disposed parallel to the rear-wheel output shaft 44 to be movable in a direction of a third axis C3 which is an axial direction in the transfer case 40. The fork shaft 102 is connected to the cam engagement member 103 via a waiting mechanism 106 and mechanically reciprocates linearly in the direction of the third axis C3 with the linear reciprocation of the cam engagement member 103. As illustrated in FIG. 5, the waiting mechanism 106 includes a pair of flanged cylindrical members 108*a* and 108*b* that is disposed on the third axis C3 to be slidable with the fork shaft 102 in a direction parallel to the third axis C3 and of which the flanges formed at one end face each other, a cylindrical spacer 110 that is disposed between the pair of flanged cylindrical members 108*a* and 108*b*, a spring member (a compression coil spring) 112 that is disposed in a preloaded state outer circumference side of the spacer 110, and a connecting clamp portion 114 that clamps the pair of flanged cylindrical members 108*a* and 108*b* to be slidable in the direction parallel to the third axis C3. The connecting clamp portion 114 is formed integrally with the cam engagement member 103 and causes the flanged cylindrical members 108*a* and 108*b* to slide over the fork shaft 102 by coming into contact with the flanges of the flanged cylindrical members 108*a* and 108*b*. The length of the flange in a state in which both the flanges of the flanged cylindrical members 108*a* and 108*b* come into contact with the connecting clamp portion 114 is set to be larger than the length of the spacer 110. Accordingly, the state in which both the flanges come into contact with the connecting clamp portion 114 is formed by a biasing force of the spring member 112. The waiting mechanism 106 includes stoppers 118*a* and 118*b* disposed in the fork shaft 102 to limit separation of the flanged cylindrical members 108*a* and 108*b* in the direction of the third axis C3. By limiting the separation of the flanged cylindrical members 108*a* and 108*b* using the stoppers 118*a* and 118*b*, the translational motion in the direction of the third axis C3 of the cam engagement member 103 can be transmitted to the fork shaft 102 via the connecting clamp portion 114. The fork shaft 102 is an example of the switching shaft.

The second transmission mechanism 88 that transmits the translational motion of the fork shaft 102 to the high-low gear shift mechanism 48 and the 4WD lock mechanism 58 includes a shift fork 104 that is disposed in the fork shaft 102. The shift fork 104 is connected to the fork connecting portion 62*a* disposed in the high-low sleeve 62, and the high-low sleeve 62 mechanically reciprocates linearly in the direction of the first axis C1 with the linear reciprocation of the fork shaft 102 to switch the gear stage of the high-low gear shift mechanism 48. That is, for example, as illustrated in FIG. 2, when the fork shaft 102 moves in the direction of the arrow F2, that is, to the rear side, in a state in which the outer circumferential teeth 62*b* of the high-low sleeve 62 mesh with the high-side gear teeth 64 to set up the high gear stage H, the high-low sleeve 62 moves to the drive gear 46 side. The outer circumferential teeth 62*b* mesh with the low-side gear teeth 66 to set up the low gear stage L. As illustrated in FIG. 4, when the fork shaft 102 moves in the opposite direction of the arrow F2, that is, to the front side, in the state in which the low gear stage L is set up, the high-low sleeve 62 moves to the side which is separated from the drive gear 46. The outer circumferential teeth 62*b* mesh with the high-side gear teeth 64 to set up the high gear stage H.

The second transmission mechanism 88 includes the first spring 72 and the second spring 74, and mechanically switches the operating state of the 4WD lock mechanism 58 by interlocking with switching of the gear stage of the high-low gear shift mechanism 48. That is as illustrated in FIG. 2, in the state in which the high-low gear shift mechanism 48 is in the high gear stage H, the 4WD lock mechanism 58 is in the disengaged state and when the high-low sleeve 62 moves to the drive gear side to switch the gear stage to the low gear stage L, the lock sleeve 70 moves to the lock position on the rear side by the biasing force of the first spring 72. The outer circumferential teeth 70*a* mesh with the lock teeth 68 to switch the 4WD lock mechanism 58 to the engaged state (the 4WD locked state). In the state in which the high-low gear shift mechanism 48 is in the low gear stage L as illustrated in FIG. 4, the 4WD lock mechanism 58 is in the engaged state. When the high-low sleeve 62 moves to the front side which is separated from the drive gear 46 and is switched to the high gear stage H, the lock sleeve 70 moves to the front side by the biasing force of the second spring 74. Meshing of the outer circumferential teeth 70*a* with the lock teeth 68 is released and the 4WD lock mechanism 58 is switched to the disengaged state. The fork shaft 102 moves between a high gear position at which the high-low gear shift mechanism 48 is in the high gear stage H and the 4WD lock mechanism 58 is in the disengaged state and a low gear position at which the high-low gear shift mechanism 48 is in the low gear stage L and the 4WD lock mechanism 58 is in the 4WD locked state in the direction of the third axis C3.

Regarding the frictional engagement element 80 of the front-wheel driving clutch 50, when the nut member 92 is rotationally driven in the opposite direction of the arrow F1 by the electric motor 84 and the fork shaft 102 moves from the low gear position to the high gear position, the pressing member 81 moves to the front side by axial movement accompanied with the rotation of the nut member 92. When the fork shaft 102 is located at any of the low gear position and the high gear position, the cutoff state in which pressing of the pressing member 81 is released is maintained. That is, the L4L driving mode is set up when the fork shaft 102 moves to the low gear position, and the H2 driving mode is set up when the fork shaft 102 moves to the high gear position. In FIG. 7, the first state indicates the position of the engagement protrusion 103*a* when the fork shaft 102 is located at the high gear position, the third state indicates the position of the engagement protrusion 103*a* when the fork shaft 102 is located at the low gear position, and the second state indicates the position of the engagement protrusion 103*a* when the fork shaft 102 is being switched between the high gear position and the low gear position.

On the other hand, when the nut member 92 is further rotationally driven in the opposite direction of the arrow F1 by the electric motor 84 in the state in which the fork shaft 102 is located at the high gear position, the pressing member 81 comes into contact with the frictional engagement element 80 with movement of the nut member 92 to the front side. The front-wheel driving clutch 50 is switched to the connected state in which a driving force is transmitted to the front wheels 14 and the H4 driving mode is set up. In the H4 driving mode, the torque-varying connected state of the front-wheel driving clutch 50, that is, the H4A driving mode in which differential rotation is permitted, and the H4L driving mode in which the front-wheel driving clutch 50 is completely connected are set up depending on the rotational position, that is, the axial position, of the nut member 92.

Figure 6:
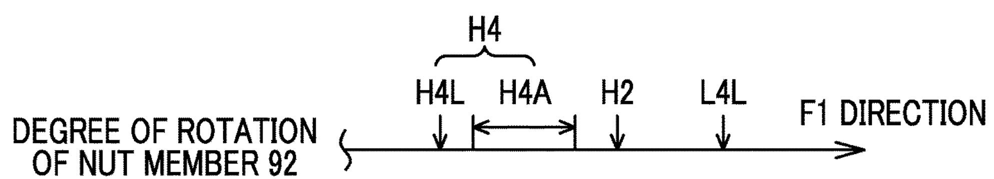
FIG. 6 is a diagram illustrating a relationship between a degree of rotation of a nut member of a screw mechanism disposed in the transfer and a driving mode.

That is, the mode switching device 82 is switched sequentially in the order of H4L driving mode↔H4A driving mode↔H2 driving mode↔L4L driving mode depending on the rotational position of the nut member 92 as illustrated in FIG. 6. In other words, when the nut member 92 is rotationally driven to rotational positions H4L, H4A, H2, and L4L illustrated in FIG. 6 by the electric motor 84, the H4L driving mode, the H4A driving mode, the H2 driving mode, and the L4L driving mode are set up. Since these rotational positions can be changed due to abrasion of the frictional engagement element 80 or the like, it is preferable that the rotational positions be sequentially adjusted by learning control or the like. The H4L position or the H4A position may be determined by control of a motor torque of the electric motor 84 corresponding to the transmission torque of the front-wheel driving clutch 50. The first vertical cam groove portion 100*e* of the cam groove 100*c* has a predetermined length such that rotation of the nut member 92 required for switching of H4L driving mode↔H4A driving mode↔H2 driving mode is permitted. The waiting mechanism 106 is configured to permit axial movement of the nut member 92, that is, relative movement in the axial direction of the cam engagement member 103 with respect to the fork shaft 102, at the time of switching of H4L driving mode↔H4A driving mode↔H2 driving mode. The first vertical cam groove portion 100*e* may be inclined to prevent axial movement of the cam engagement member 103.

The transfer 22 includes a shaft positioning mechanism 120 that positions the fork shaft 102 at the high gear position or the low gear position. The shaft positioning mechanism 120 includes a reception hole 122 that is formed in the inner circumferential surface of the transfer case 40 over which the fork shaft 102 slides, a lock ball 124 that is received in the reception hole 122, a locking spring 126 that biases the lock ball 124 received in the reception hole 122 to the fork shaft 102 side, and a pair of recessed portions 128*h* and 1281 that are formed on the outer circumferential surface of the fork shaft 102. The fork shaft 102 is positioned at the high gear position by engaging the lock ball 124 with the recessed portion 128*h*, and the fork shaft 102 is positioned at the low gear position by engaging the lock ball 124 with the recessed portion 1281. Even when an output from the electric motor 84 is stopped at the gear positions, the gear positions of the fork shaft 102 are maintained by the shaft positioning mechanism 120.

The transfer 22 includes a low gear position detecting switch 130 that detects the low gear position of the fork shaft 102. The low gear position detecting switch 130 is, for example, a ball type contact switch and detects movement to the low gear position by coming in contact with the fork shaft 102 having moved to the low gear position. When the low gear position detecting switch 130 detects that the fork shaft is located at the low gear position, for example, an indicator that notifies a driver that a current driving mode is the L4L driving mode is turned on. The indicator is disposed, for example, in a display device 240.

Referring to FIG. 1 again, the four-wheel-drive vehicle 10 includes an electronic control unit 200 as a controller for switching the driving mode, controlling the output of the engine 12, or switching the gear stage of the transmission 20. The electronic control unit 200 is constituted by a microcomputer including a CPU, a RAM, a ROM, and an input-outer interface and performs a variety of control by performing signal processing in accordance with a program stored in advance in the ROM using a temporary storage function of the RAM. The electronic control unit 200 is partitioned for driving mode switching control, output control of the engine 12, gear shift control of the transmission 20, and the like if necessary. The electronic control unit 200 is supplied with a variety of information based on detection signals from various sensors disposed in the four-wheel-drive vehicle 10. Examples of various sensors include a low gear position detecting switch 130, an engine rotation speed sensor 202, a motor rotation angle sensor 204, wheel speed sensors 206, an accelerator depression sensor 208, a high-low switch 210 that is operated by a driver to switch the gear stage between the high gear stage H and the low gear stage L, a 4WD selection switch 212 that is operated by a driver to select the 4WD state, a 4WD lock selecting switch 214 that is operated by a driver to select the 4WD locked state, and a shift position sensor 222 that detects an operation position Psh of the shift lever 220 which is operated by a driver. Examples of a variety of information includes a low gear position Plg, an engine rotation speed Ne, a motor rotation angle θm, wheel speeds Nwfl, Nwfr, Nwrl, and Nwrr of the front wheels 14L and 14R and the rear wheels 16L and 16R, an accelerator depression amount θacc, a gear stage Shl that is selected by the high-low switch 210, a 4WD request 4WDon that is a signal indicating that the 4WD selection switch 212 is operated, 4LOCKon that is a signal indicating that the 4WD lock selecting switch 214 is operated, and an operation position Psh of the shift lever 220.

As illustrated in FIG. 1, for example, an engine output control command signal Se for output control of the engine 12, an operation command signal Sd for switching a state of the front-side clutch 36, a gear shift command signal Ssh for switching the gear stage of the transmission 20, and a motor drive command signal Sm for controlling a rotation quantity of the electric motor 84 to switch the driving mode are output from the electronic control unit 200 to the engine 12, an actuator of the front-side clutch 36, the transmission 20, and the electric motor 84. For example, a display signal Si for displaying a message for notifying that a mode switching operation is a violation operation in addition to a message for notifying the L4L driving mode is output to the display device 240 disposed in an instrument panel or the like. The display device 240 includes a sound output device that generates buzzer sound as well as visual display.

The electronic control unit 200 functionally includes a mode switching control unit 230 and switches the driving mode to the driving modes H4Lm H4A, H2, and L4L based on an operation on the high-low switch 210, the 4WD selection switch 212, and the 4WD lock selecting switch 214 or driving conditions of the vehicle. Among these, the L4L driving mode is a driving mode that can be suitably selected when the vehicle travels off road such as on a riverbed, a rocky area, or a steep slope with a large torque at a low speed, and the electric motor 84 of the mode switching device 82 is controlled such that the driving mode is switched to the L4L driving mode when all of first to third conditions are satisfied. The first condition is a stop state in which a vehicle speed V is substantially 0. The second condition is a neutral state in which the transmission 20 is in a neutral stage and transmission of power between the engine 12 and the input shaft 42 is cut off. The third condition is that the low gear stage L, that is, the L4L driving mode, is selected by operation on the high-low switch 210. When the low gear stage L is selected by the high-low switch 210, the L4L driving mode is necessarily set up, thus a low gear selecting operation of selecting the low gear stage L corresponds to an L4L selecting operation, and the high-low switch 210 serves as a low gear driving mode selecting device.

The mode switching control unit 230 functionally includes an L4L switching estimating unit 232, an H2 switching unit 234, an L4L switching determining unit 236, and an L4L switching executing unit 238 to perform L4L switching control of switching the driving mode to the L4L driving mode. The mode switching control unit 230 performs signal processing in accordance with Steps S1 to S23 (hereinafter simply referred to as S1 to S23) in the flowcharts illustrated in FIGS. 8 and 9. S1 to S4 and S6 to S11 in FIG. 8 correspond to signal processing of the L4L switching estimating unit 232, and S5 corresponds to signal processing of the H2 switching unit 234. S12 to S15 and S20 to S22 in FIG. 9 correspond to signal processing of the L4L switching determining unit 236, and S16 and S17 correspond to signal processing of the L4L switching executing unit 238. The L4L switching estimating unit 232 and the H2 switching unit 234 serve as the first switching control unit, and the L4L switching determining unit 236 and the L4L switching executing unit 238 serve as the second switching control unit.

Figure 8:
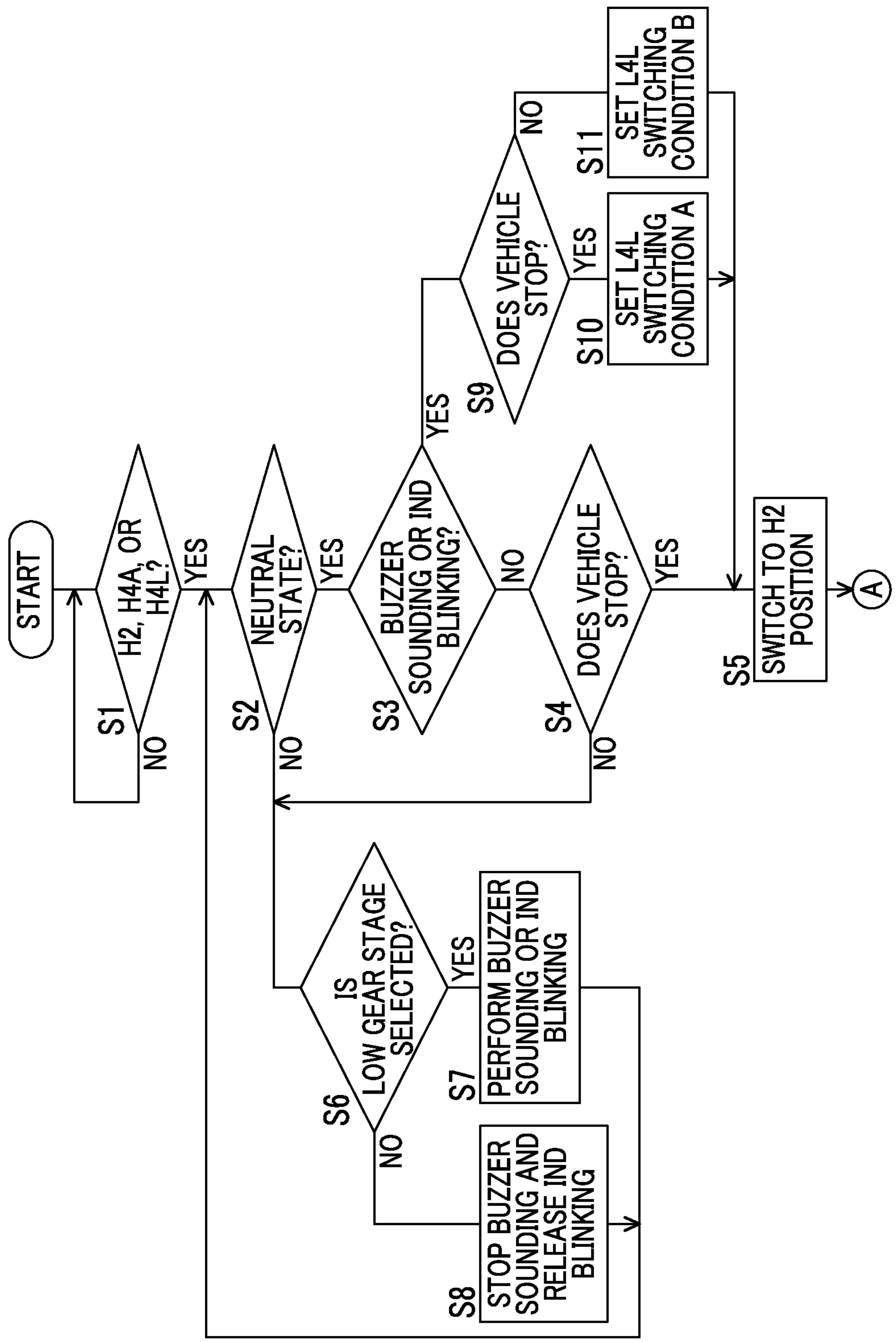
FIG. 8 is a flowchart specifically illustrating signal processing which is performed by a mode switching control unit in FIG. 1.

In S1 of FIG. 8, whether the vehicle is driven in any one of the H2 driving mode, the H4A driving mode, and the H4L driving mode other than the L4L driving mode is determined, for example, based on a signal from the low gear position detecting switch 130 or the motor rotation angle sensor 204. When the vehicle is driven in any one of the H2 driving mode, the H4A driving mode, and the H4L driving mode, S2 and steps subsequent thereto are performed and it is determined whether the vehicle is in the neutral state. In this embodiment, whether the vehicle is in the neutral state can be determined depending on whether a neutral operation of shifting the shift lever 220 to the N position has been performed, and S3 is performed when the neutral operation has been performed. When the transmission 20 is a manual transmission, it can be determined in S2 whether the input clutch is in the cutoff state by depression of a clutch pedal. In S3, it is determined whether buzzer sounding or blinking of an IND lamp indicating that a violation operation has been performed in S7 is performed. When display of violation is not performed, that is, when the violation operation is not performed, it is determine din S4 whether the vehicle is in the stop state. When the vehicle is in the stop state, S5 is performed, the driving mode is switched to the H2 driving mode by rotationally driving the electric motor 84 of the mode switching device 82 to rotate the nut member 92 to the H2 position. When the current driving mode is the H2 driving mode, it is not necessary to perform the driving mode switching control.

When the determination result of S2 is NO (negative), that is, when the shift lever 220 is not at the N position, it is determined in S6 whether the low gear selecting operation has been performed. When the low gear selecting operation has been performed, that is, when the low gear selecting operation has been performed before the neutral operation is performed or the vehicle stops, S7 is performed and buzzer sounding and blinking of the IND lamp in the display device 240 are performed to indicate the violation operation. When the low gear selecting operation has not been performed, S8 is performed subsequent to S6, the buzzer sounding is stopped, the blinking of the IND lamp is released, and then S2 is performed again. When the display of violation is not performed, S2 is performed again. When the determination result of S4 is No, that is, when the neutral operation has been performed but the vehicle is not in the stop state, S6 and steps subsequent thereto are performed.

When the determination result of S3 is YES (positive), that is, when the neutral operation has been performed in a state in which the display of violation in S7 is maintained and S3 has been performed subsequent to S2, S9 is then performed. It is determined in S9 whether the vehicle is in the stop state, and when the vehicle is in the stop state, that is, when all of three conditions for switching to the L4L driving mode are satisfied, L4L switching condition A is set in S10 and then the driving mode is switched to the H2 driving mode in S5. This case is a case in which all of three conditions are satisfied and the neutral operation of the shift lever 220 has been finally performed. A predetermined waiting time is set as L4L switching condition A to confirm that the shifting operation is not a shifting operation to the R position or the D position via the N position, but S5 is immediately performed to switch the driving mode to the H2 driving mode without waiting for the elapse of the waiting time. When the determination result of S9 is NO, that is, when the vehicle is not in the stop state, L4L switching condition B is set in S11 and then the driving mode is switched to the H2 driving mode in S5. In this case, since the condition of being in the stop state among the three conditions is not satisfied, the stop state is set as L4L switching condition B.

Figure 9:
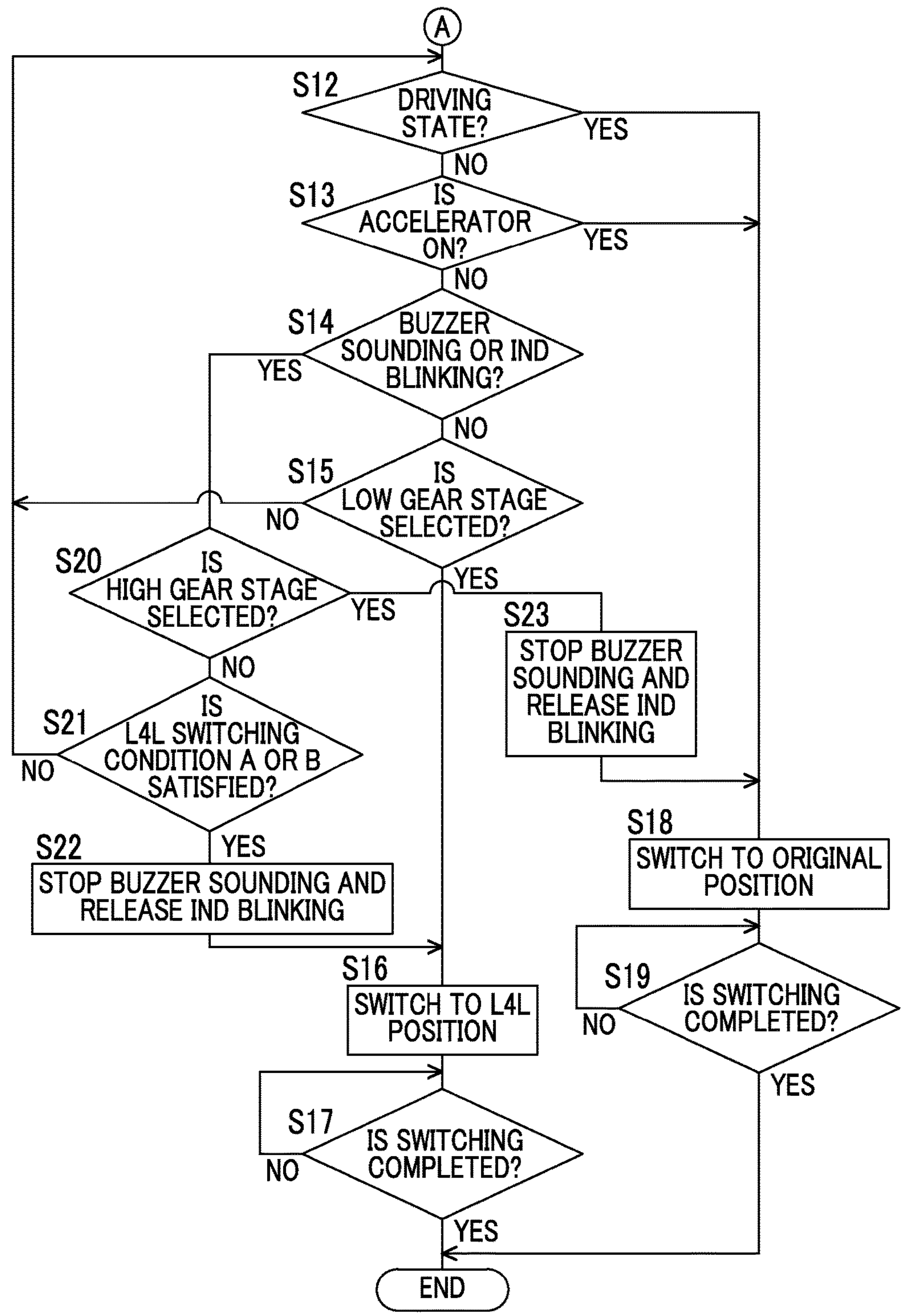
FIG. 9 is a flowchart illustrating steps subsequent to A in FIG. 8.

In S12 of FIG. 9, it is determined whether the vehicle is in a driven state. Whether the vehicle is in a driven state can be determined depending on whether the shift lever 220 has been shifted to the D position or the R position in this embodiment. For example, the shift lever is shifted to the D position or the R position via the N position. When the transmission 20 is a manual transmission, the driven state can be determined depending on whether the input clutch is in the connected state without depressing the clutch pedal, and the determination result is YES only when the clutch pedal is temporarily depressed. When the vehicle is in the driven state, it is considered that there is no will of switching the driving mode to the L4L driving mode and thus S18 and S19 are performed to return the driving mode to the original driving mode before the driving mode is switched to the H2 driving mode in S5. When the vehicle is not in the driven state, S13 is performed and whether the vehicle is in an accelerator ON state in which an accelerator pedal is depressed is determined, for example, depending on whether the accelerator depression amount θacc is equal to or greater than a predetermined value. In the accelerator ON state, it is intended to start immediately, thus it is not proper that the switching control to the L4L driving mode is continuously performed, and S18 and S19 are performed to return the driving mode to the original driving mode.

When the determination results of S12 and S13 are NO, it is determined in S14 whether the display of violation is performed. When the display of violation is not performed, S15 is performed. In S15, it is determined whether the low gear selecting operation has been performed. When the low gear selecting operation has not been performed, S12 and steps subsequent thereto are repeatedly performed. On the other hand, when the low gear selecting operation has been performed, S16 and S17 are performed to switch the driving mode from the H2 driving mode to the L4L driving mode by rotationally driving the electric motor 84 of the mode switching device 82 to rotate the nut member 92 from the H2 position to the L4L position. The determination result of S15 is YES because the low gear selecting operation has been performed, and when S16 and S17 have been performed subsequent to S15, the driving mode has been already switched to the H2 driving mode. Accordingly, it is possible to rapidly set up the L4L driving mode after the low gear selecting operation has been performed.

When the determination result of S14 is YES, that is, when the display of violation is performed, S20 is performed. In S20, it is determined whether the high gear stage H is selected by the high-low switch 210. When the high gear stage H is selected, there is no will of switching the driving mode to the L4L driving mode. Accordingly, the display of violation is released in S23 and then S18 and S19 are performed to return the driving mode to the original driving mode. When the high gear stage H is not selected, that is, when the state in which the low gear stage L has been selected is maintained, S21 is performed subsequent to S20. In S21, it is determined whether L4L switching condition A or B set in S10 or S11 is satisfied. When L4L switching condition A or B is not satisfied, S12 and steps subsequent thereto are repeatedly performed. When L4L switching condition A or B is satisfied, S22 is performed subsequent to S21 to release the display of violation, and then S16 and S17 are performed to switch the driving mode to the L4L driving mode. In this case, since the driving mode has been already switched to the H2 driving mode, it is possible to set up the L4L driving mode rapidly when L4L switching condition A or B is satisfied. Specifically, when all of the first to third conditions for switching the driving mode to the L4L driving mode are satisfied and the waiting time is set as L4L switching condition A in S10, switching to the H2 driving mode is performed in the waiting time. Accordingly, it is possible to set up the L4L driving mode rapidly after the waiting time elapses. When the second condition other than the first condition which is the stop state is satisfied and the stop state is set as L4L switching condition B in S11, switching to the H2 driving mode is performed before the vehicle becomes the stop state. Accordingly, it is possible to set up the L4L driving mode rapidly after the vehicle becomes the stop state.

Figure 10:
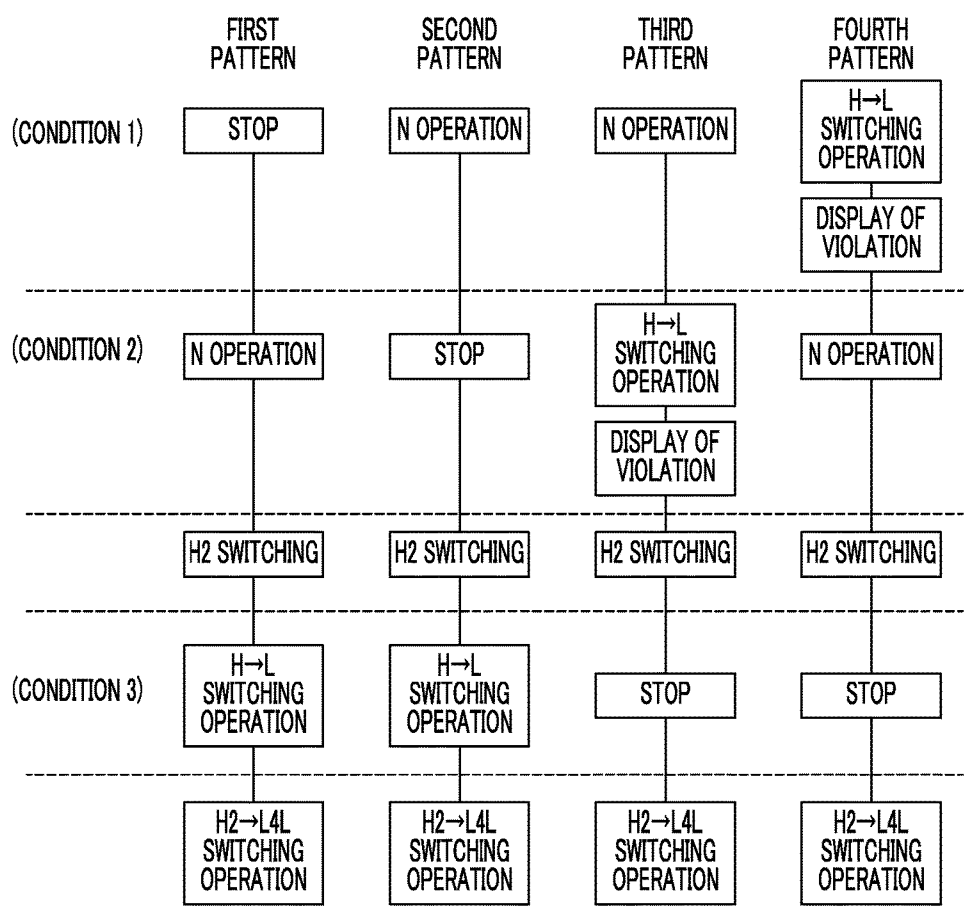
FIG. 10 is a diagram illustrating some switching patterns for switching a driving mode from a high-gear four-wheel lock (H4L) driving mode or a high-gear four-wheel automatic (H4A) driving mode to a low-gear four-wheel lock (L4L) driving mode via a high-gear two-wheel (H2) driving mode based on the flowcharts illustrated in FIGS. 8 and 9.
Figure 11:
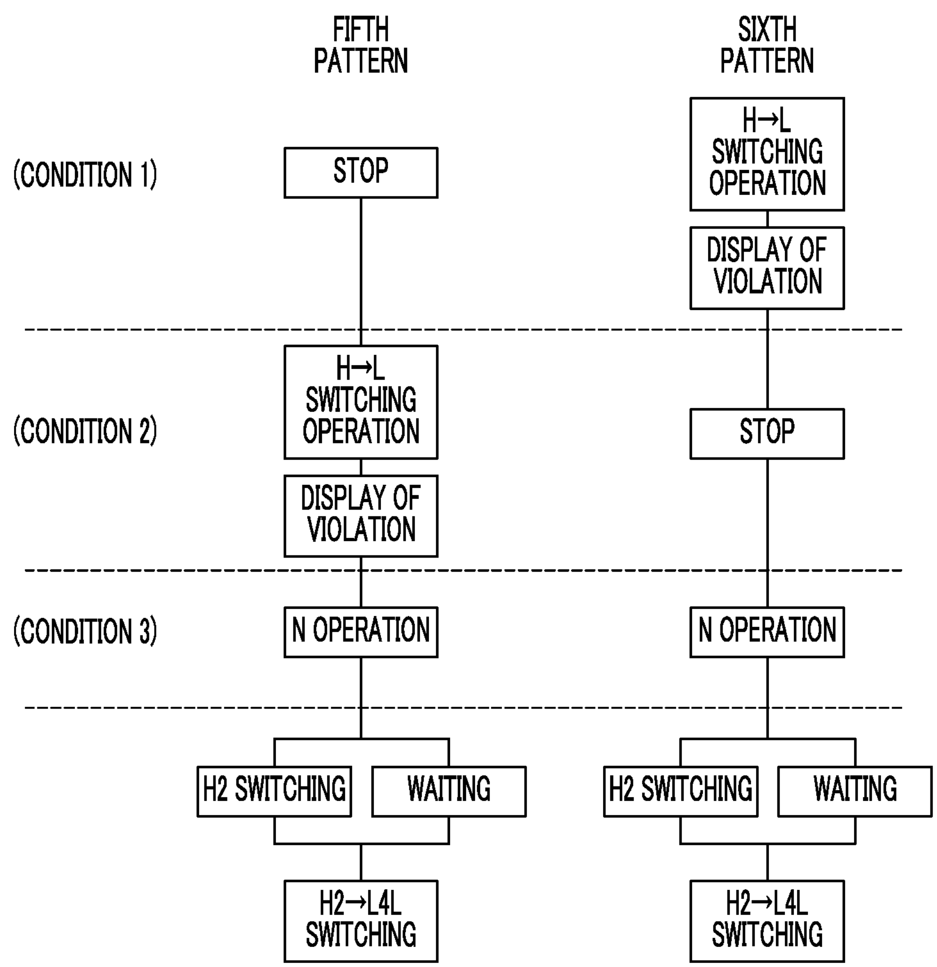
FIG. 11 is a diagram illustrating switching patterns other than those illustrated in FIG. 10.

FIGS. 10 and 11 are diagrams illustrating switching patterns for switching to the L4L driving mode, which are classified into six switching patterns depending on whether the first to third conditions are satisfied and the timing of switching to the H2 driving mode, in accordance with the flowcharts illustrated in FIGS. 8 and 9. "Stop," "N operation," and "H→L switching operation" in FIGS. 10 and 11 refer to the stop state, the neutral operation (the neutral state), and the low gear selecting operation, respectively, and are the first to third conditions for switching to the L4L driving mode. "Waiting" in FIG. 11 refers to the waiting time which is set as L4L switching condition A in S10 in FIG. 8.

The first pattern and the second pattern in FIG. 10 are switching patterns in which the driving mode is switched to the H2 driving mode at a time point at which the first condition and the second condition other than the third condition are satisfied and the L4L driving mode is rapidly set up after the low gear selecting operation has been performed and the driving mode is switched to the L4L driving mode by a regular operation. Here, when the low gear selecting operation has been performed but the stop state and the neutral state are not satisfied, the L4L driving mode is not selected and thus satisfaction of the first and second conditions can be said to be permission conditions for permitting the low gear selecting operation. Accordingly, the low gear selecting operation when both the first and second conditions are satisfied is regarded as a regular operation, and the low gear selecting operation before the first and second conditions are satisfied is regarded as a violation operation. Specifically describing the flowcharts illustrated in FIGS. 8 and 9, for example, when the steps of S1, S2, S3, S4, S5, S12, S13, S14, S15 (a loop of S12 to S15), S16, and S17 are sequentially performed to perform switching control, the switching pattern of the first pattern or the second pattern is achieved.

The third pattern in FIG. 10 is a switching pattern in which the display of violation in S7 is performed because the vehicle is not in the stop state yet by performing the low gear selecting operation subsequently to the neutral operation, the driving mode is switched to the H2 driving mode because the second condition is satisfied including the neutral state, and the L4L driving mode is set up rapidly after the vehicle stops. Specifically describing the flowcharts illustrated in FIGS. 8 and 9, for example, when the steps of S1, S2, S3, S4, S6, S7, S2, S3, S9, S11, S5, S12, S13, S14, S20, S21 (a loop of S12 to S21), S22, S16, and S17 are sequentially performed to perform switching control, the switching pattern of the third pattern is achieved.

The fourth pattern in FIG. 10 is a switching pattern in which the display of violation in S7 is performed because the low gear selecting operation is performed before the neutral operation is performed, two conditions including the neutral state are satisfied by performing the neutral operation, the driving mode is switched to the H2 driving mode, and the L4L driving mode is rapidly set up after the vehicle becomes the stop state. Specifically describing the flowcharts illustrated in FIGS. 8 and 9, for example, when the steps of S1, S2, S6, S7, S2, S3, S9, S11, S5, S12, S13, S14, S20, S21 (a loop of S12 to S21), S22, S16, and S17 are sequentially performed to perform switching control, the switching pattern of the fourth pattern is achieved.

The fifth pattern and the sixth pattern in FIG. 11 are switching patterns in which the display of violation in S7 is performed because the low gear selecting operation is performed before the neutral operation is performed, the driving modes is switched to the H2 driving mode after the neutral operation is performed by performing the neutral operation after the vehicle becomes the stop state, and the L4L driving mode is set up after a predetermined waiting time elapses after the neutral operation. Specifically describing the flowcharts illustrated in FIGS. 8 and 9, for example, when the steps of S1, S2, S6, S7, S2, S3, S9, S10, S5, S12, S13, S14, S20, S21 (a loop of S12 to S21), S22, S16, and S17 are sequentially performed to perform switching control, the switching pattern of the fifth or sixth pattern is achieved.

In this way, in the four-wheel-drive vehicle 10 according to this embodiment, as in the switching patterns of the first to fourth patterns in FIG. 10, the driving mode is switched to the H2 driving mode when two conditions including the second condition among the first to third conditions are satisfied at the time of driving in the H4L driving mode or the H4A driving mode, and the driving modes is switched from the H2 driving mode to the L4L driving mode when the remaining condition is satisfied. Accordingly, it is possible to shorten the time required for switching to the L4L driving mode after all of the first to third conditions are satisfied. Accordingly, even when a starting operation of shifting the shift lever 220 to the D position or the like has been performed immediately after all of the first to third conditions are satisfied, the time required for switching after all of the first to third conditions are satisfied is short and thus it is possible to appropriately prevent gear noise or the like from being generated in the transmission of power due to the starting operation at the time of transient gear shift of the high-low gear shift mechanism 48. When two conditions including the neutral state are satisfied, the driving mode is switched to the H2 driving mode. Accordingly, it is possible to shorten the time required for switching to the L4L driving mode such that an influence such as a variation of a driving force is not given to the behavior of the vehicle and a driver does not feel discomfort.

Particularly, even in the switching patterns of the third pattern and the fourth pattern in FIG. 10, that is, when a violation operation of performing the low gear selecting operation before the neutral operation or the stop state has been performed, when two conditions of the low gear selecting operation and the neutral state are satisfied as well as when the switching operation to the L4L driving mode has been performed as a regular operation included in the first pattern and the second pattern in FIG. 10, the driving mode is switched to the H2 driving mode during travel and the driving mode is switched from the H2 driving mode to the L4L driving mode after the vehicle stops. That is, by switching the driving mode to the H2 driving mode before all of the first to third conditions are satisfied, the number of types of switching patterns capable of shortening the time required for switching to the L4L driving mode after all of the first to third conditions are satisfied increases. Accordingly, it is possible to more appropriately prevent generation of gear noise or the like when a starting operation has been performed immediately after all of the first to third conditions are satisfied. In this case, since the transmission 20 is switched to the neutral stage by the neutral operation, it is possible to shorten the time required for switching to the L4L driving mode such that a driver does not feel discomfort due to a variation in the driving force.

On the other hand, in this embodiment, as described in the switching patterns of the fifth pattern and the sixth pattern in FIG. 11, when a violation operation of performing the low gear selecting operation before the neutral operation is performed has been performed, the vehicle has stopped with the low gear selecting operation state maintained, and the neutral operation has been performed, the driving mode is switched to the L4L driving mode after a predetermined waiting time elapses after the neutral operation, but since the driving mode is switched to the H2 driving mode for the waiting time, it is possible to shorten the required time until the L4L driving mode is set up after the waiting time elapses.

in the embodiment of the disclosure, the switching control to the L4l driving mode has only to be performed in accordance with one switching pattern of at least the first pattern and the second pattern among four switching patterns illustrated in FIG. 10. In other words, only when a regular operation has been performed, the switching control to the L4L driving mode may be performed in accordance with the switching patterns. The display of violation is not essential to the disclosure, and whether to perform display of violation can be appropriately set.

While embodiments of the disclosure have been described above in detail with reference to the accompanying drawings, they are only examples and the disclosure can be embodied with various modifications and improvements based on knowledge of those skilled in the art.

What is claimed is:

1. A control device for a four-wheel-drive vehicle, the vehicle including an input shaft, a first output shaft, a second output shaft, a high-low gear shift mechanism, a clutch, a mode switching device, and a mode selection operating device, the first output shaft being configured to output a driving force to one of front wheels and rear wheels, the second output shaft being configured to output the driving force to the other of the front wheels and the rear wheels, the high-low gear shift mechanism being configured to shift a rotation speed of the input shaft to one of a high gear stage and a low gear stage and being configured to transmit the driving force to the first output shaft, the clutch being configured to disengage and engage to cut off and establish transmission of power between the first output shaft and the second output shaft, the mode switching device being configured to mechanically switch between a high-gear four-wheel driving mode and a low-gear driving mode via a high-gear two-wheel driving mode, the high-gear four-wheel driving mode being a first driving mode of the vehicle in which the high-low gear shift mechanism is set to the high gear stage and the clutch is in an engagement state, the high-gear two-wheel driving mode being a second driving mode of the vehicle in which the high-low gear shift mechanism is set to the high gear stage and the clutch is in a disengagement state, the low-gear driving mode being a third driving mode of the vehicle in which the high-low gear shift mechanism is set to the low gear stage, the mode selection operating device being a device that is operated by a driver to select the low-gear driving mode, the control device comprising:

an electronic control unit configured to control the mode switching device such that the driving mode is switched to the low-gear driving mode when the electronic control unit determines that all of a first condition, a second condition, and a third condition are satisfied, the first condition being a condition of the vehicle being in a stop state, the second condition being a condition of transmission of power being in a neutral state in which transmission of power between a driving force source and the input shaft is cut off, the third condition being a condition of the low-gear driving mode being selected by operation of the mode selection operating device, the electronic control unit being configured to control the mode switching device such that the driving mode is switched from the high-gear four-wheel driving mode to the high-gear two-wheel driving mode when the electronic control unit determines that the first condition and the second condition are satisfied at a time of driving in the high-gear four-wheel driving mode, and the electronic control unit being configured to control the mode switching device such that the driving mode is switched from the high-gear two-wheel driving mode to the low-gear driving mode when the electronic control unit determines that the third condition is satisfied in a first state in which the first condition and the second condition have been satisfied.

2. The control device for the four-wheel-drive vehicle according to claim 1, wherein the electronic control unit is configured to control the mode switching device such that the driving mode is switched from the high-gear four-wheel driving mode to the high-gear two-wheel driving mode when the electronic control unit determines that the second condition and one of the first condition and the third condition are satisfied at the time of driving the vehicle in the high-gear four-wheel driving mode, and the electronic control unit is configured to control the mode switching device such that the driving mode is switched from the high-gear two-wheel driving mode to the low-gear driving mode when the electronic control unit determines that the other of the first condition and the third condition is satisfied in a second state in which the second condition and one of the first condition and the third condition are satisfied.

3. A control method for a four-wheel-drive vehicle, the vehicle including an input shaft, a first output shaft, a second output shaft, a high-low gear shift mechanism, a clutch, a mode switching device, a mode selection operating device, and an electronic control unit, the first output shaft being configured to output a driving force to one of front wheels and rear wheels, the second output shaft being configured to output the driving force to the other of the front wheels and the rear wheels, the high-low gear shift mechanism being configured to shift a rotation speed of the input shaft to one of a high gear stage and a low gear stage and being configured to transmit the driving force to the first output shaft, the clutch being configured to disengage and engage to cut off and establish transmission of power between the first output shaft and the second output shaft, the mode switching device being configured to mechanically switch between a high-gear four-wheel driving mode and a low-gear driving mode via a high-gear two-wheel driving mode, the high-gear four-wheel driving mode being a first driving mode of the vehicle in which the high-low gear shift mechanism is set to the high gear stage and the clutch is in an engagement state, the high-gear two-wheel driving mode being a second driving mode of the vehicle in which the high-low gear shift mechanism is set to the high gear stage and the clutch is in a disengagement state, the low-gear driving mode being a third driving mode of the vehicle in which the high-low gear shift mechanism is set to the low gear stage, the mode selection operating device being a device that is operated by a driver to select the low-gear driving mode, the control method comprising:

controlling, by the electronic control unit, the mode switching device such that the driving mode is switched to the low-gear driving mode when the electronic control unit determines that all of a first condition, a second condition, and a third condition are satisfied;

controlling, by the electronic control unit, the mode switching device such that the driving mode is switched from the high-gear four-wheel driving mode to the high-gear two-wheel driving mode when the electronic control unit determines that the first condition and the second condition are satisfied at a time of driving in the high-gear four-wheel driving mode; and controlling, by the electronic control unit, the mode switching device such that the driving mode is switched from the high-gear two-wheel driving mode to the low-gear driving mode when the electronic control unit determines that the third condition is satisfied in a state in which the first condition and the second condition have been satisfied, the first condition being a condition of the vehicle being in a stop state, the second condition being a condition of transmission of power being in a neutral state in which transmission of power between a driving force source and the input shaft is cut off, and the third condition being a condition of the low-gear driving mode being selected by operation of the mode selection operating device.

* * * * *